INVENTORS
RALPH COVER
PAUL F. COVER
BY Cushman, Darby & Cushman
ATTORNEYS

May 5, 1964 R. COVER ETAL 3,131,699
CORN CUTTING MACHINE
Original Filed Sept. 24, 1957 13 Sheets-Sheet 4

INVENTORS
RALPH COVER
PAUL F. COVER
BY Cushman, Darby & Cushman
ATTORNEYS

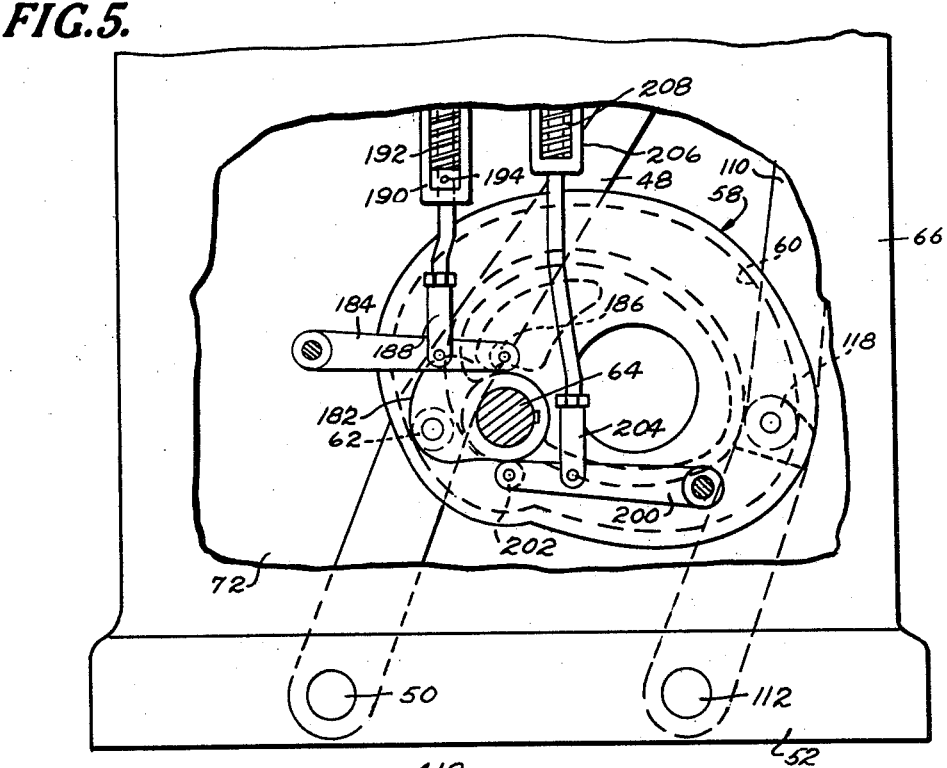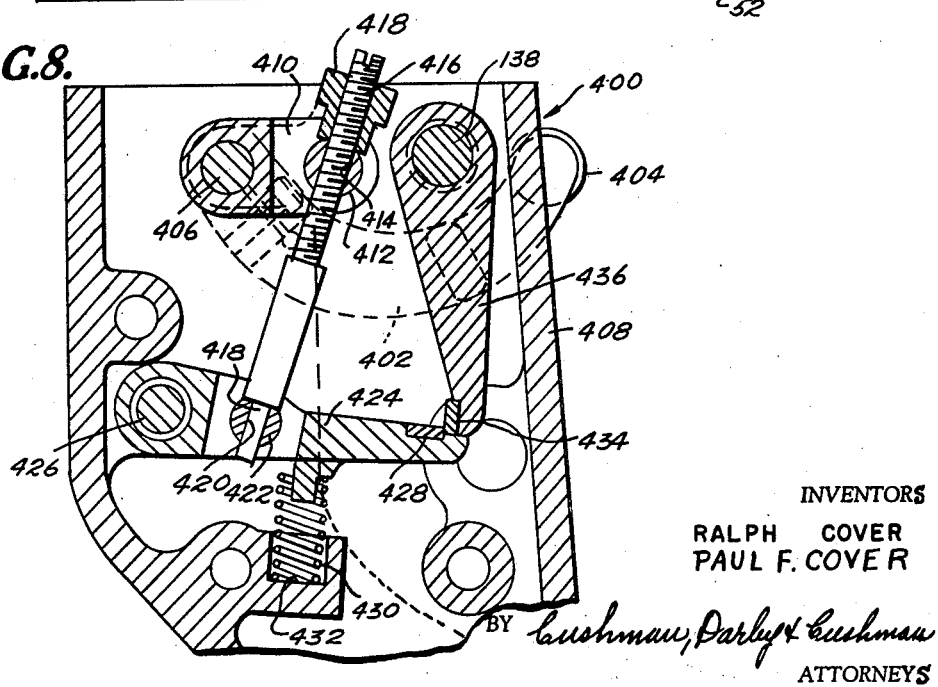

INVENTORS
RALPH COVER
PAUL F. COVER

BY Cushman, Darby & Cushman
ATTORNEYS

May 5, 1964 R. COVER ETAL 3,131,699
CORN CUTTING MACHINE
Original Filed Sept. 24, 1957 13 Sheets-Sheet 7

INVENTORS
RALPH COVER
PAUL F. COVER
BY *Cushman, Darby & Cushman*
ATTORNEYS

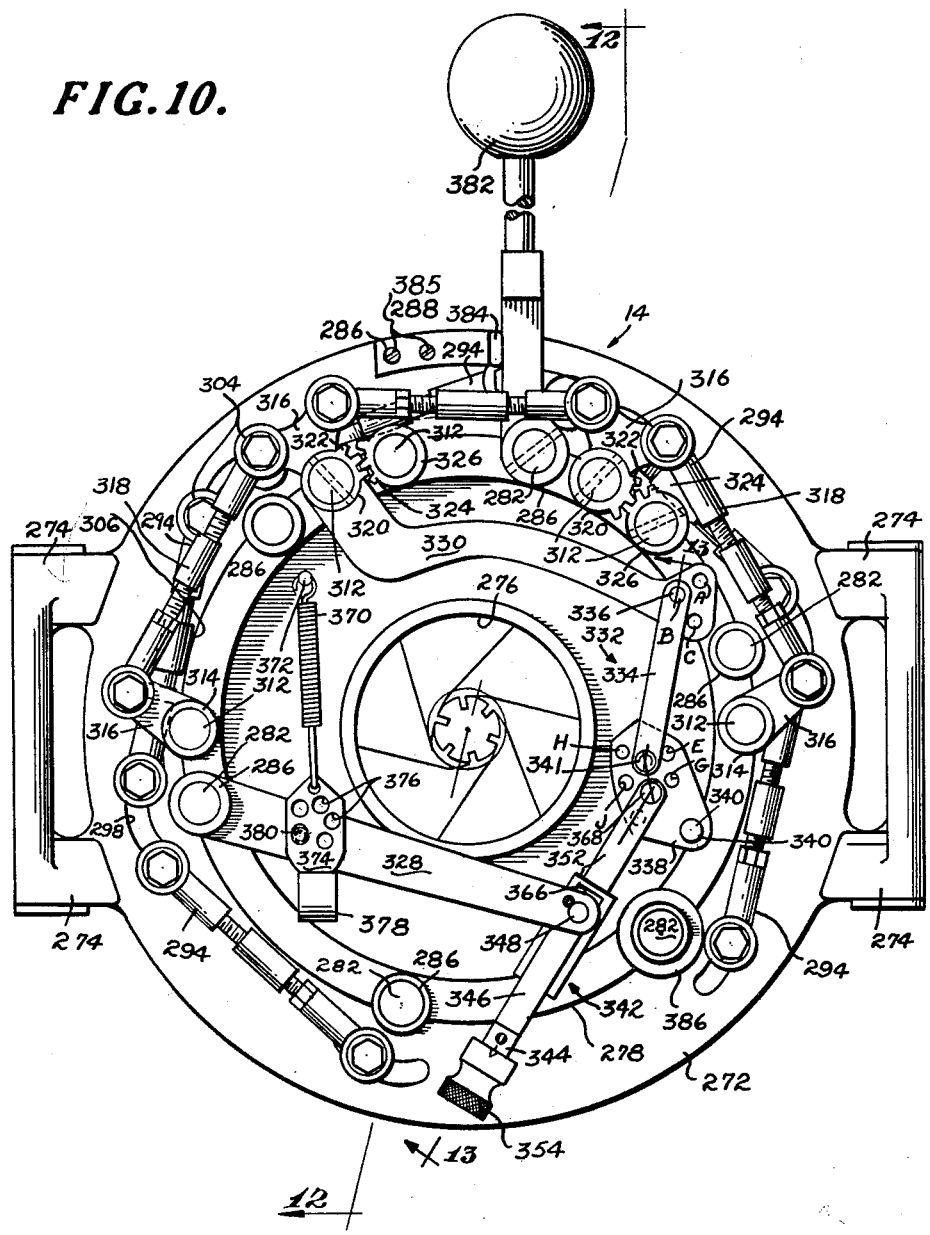

May 5, 1964
R. COVER ETAL
3,131,699
CORN CUTTING MACHINE
Original Filed Sept. 24, 1957
13 Sheets—Sheet 9
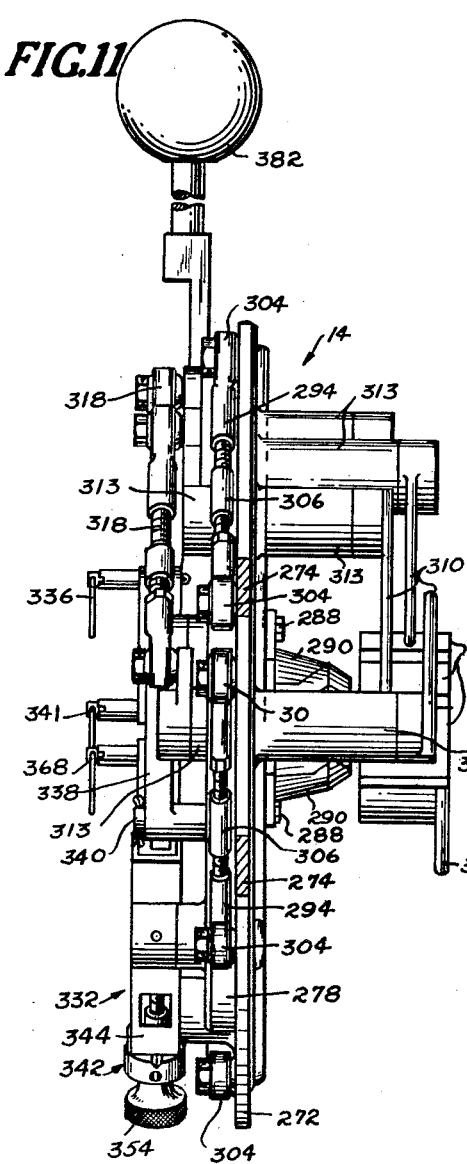
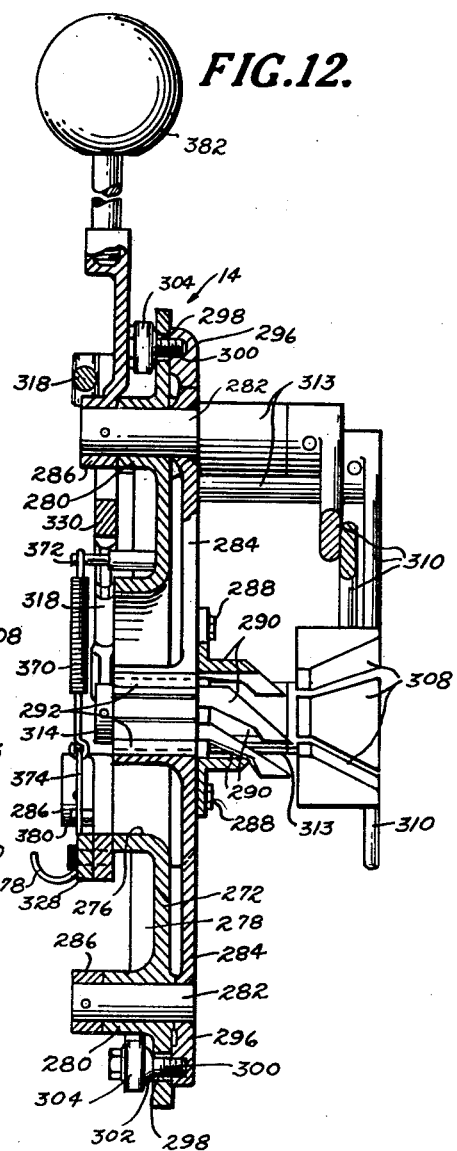
INVENTORS
RALPH COVER
PAUL F. COVER
BY Cushman, Darby & Cushman
ATTORNEYS May 5, 1964 R. COVER ETAL 3,131,699
CORN CUTTING MACHINE
Original Filed Sept. 24, 1957 13 Sheets-Sheet 10
FIG.13.
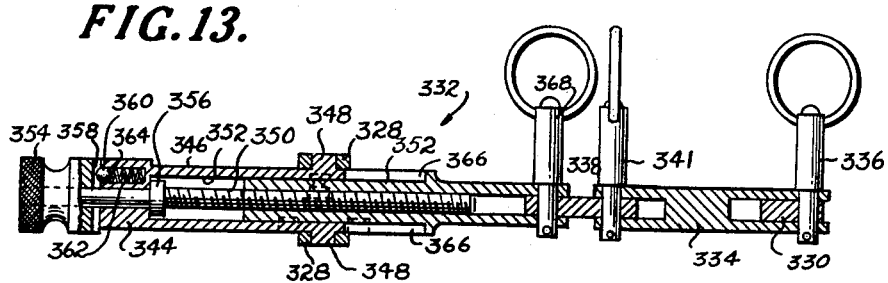
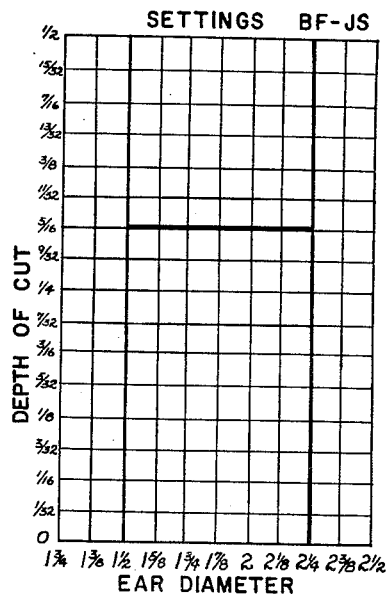
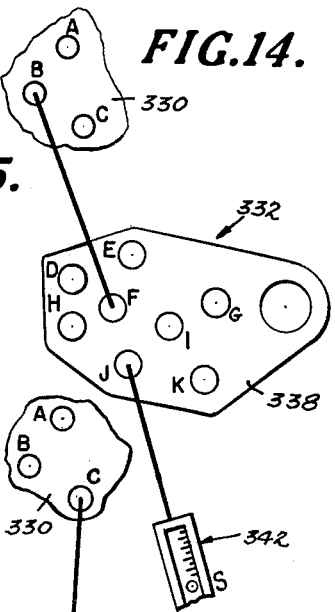
FIG.14.
FIG.15.
FIG.16.
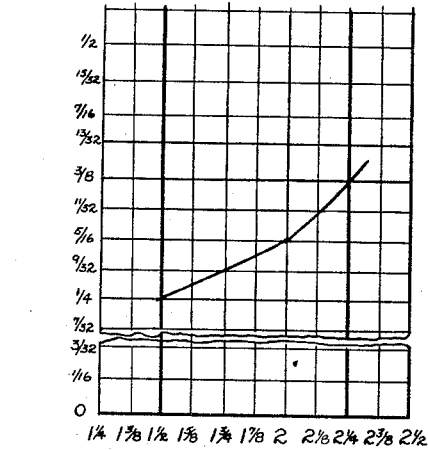
FIG.17.
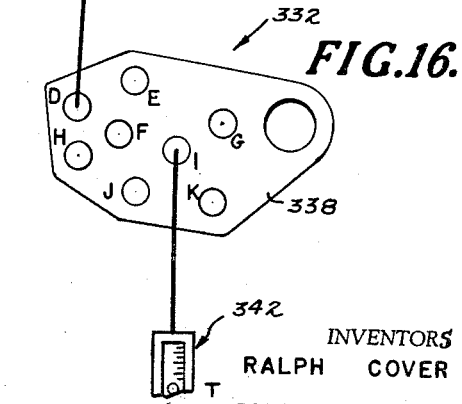
INVENTORS
RALPH COVER
PAUL F. COVER
BY Cushman, Darby & Cushman
ATTORNEYS May 5, 1964

R. COVER ETAL 3,131,699

CORN CUTTING MACHINE

Original Filed Sept. 24, 1957

INVENTORS
RALPH COVER
PAUL F. COVER

BY *Cushman, Darby & Cushman*

ATTORNEYS

May 5, 1964  R. COVER ETAL  3,131,699
CORN CUTTING MACHINE
Original Filed Sept. 24, 1957  13 Sheets-Sheet 12
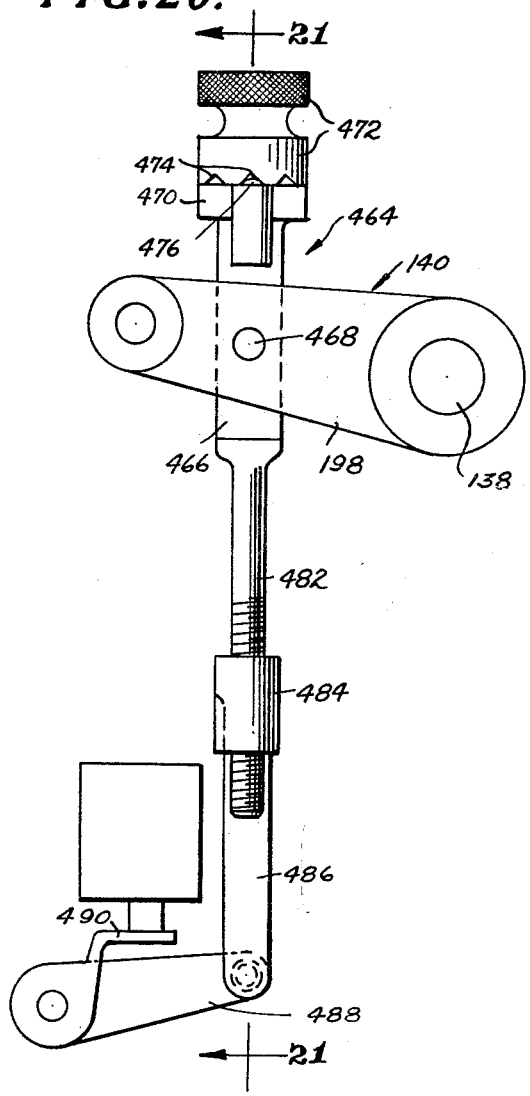
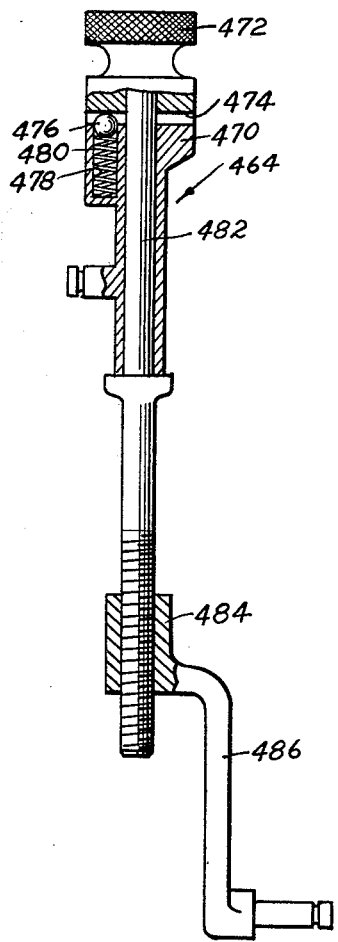
INVENTORS
RALPH COVER
PAUL F. COVER
BY *Cushman, Darby & Cushman*
ATTORNEYS May 5, 1964

R. COVER ETAL 3,131,699

CORN CUTTING MACHINE

Original Filed Sept. 24, 1957

INVENTORS
RALPH COVER
PAUL F. COVER

BY Cushman, Darby & Cushman
ATTORNEYS 3,131,699
CORN CUTTING MACHINE
Ralph Cover and Paul F. Cover, both % The United Company, Tuc Road, Westminster, Md.
Original application Sept. 24, 1957, Ser. No. 685,866, now Patent No. 2,951,484, dated Sept. 6, 1960. Divided and this application Feb. 1, 1960, Ser. No. 5,720
6 Claims. (Cl. 130—9)

This invention relates to machines for cutting corn and more particularly to an improved machine for cutting kernels from ears of fresh green corn. This application constitutes a division of our application Serial No. 685,-866, filed September 24, 1957, now Patent No. 2,951,484, dated September 6, 1960.

Heretofore, there have been two general types of corn cutting equipment utilized in the corn processing industry. One type of machine utilizes a cutting head in which a series of circumferentially spaced cutting blades are mounted for substantially radial movement only and the ears to be cut are fed individually through the cutting blades by a reciprocating pusher rod. Generally, machines of this type embody a pair of opposed cutting heads and a unitary pusher bar assembly reciprocates between the cutting heads, alternatively feeding one ear to one head during movement toward the same and the next ear to the other head as the pusher rod moves in the opposite direction. These machines have the advantage that each ear of corn is handled individually and the cutting blades do not move rapidly with respect to the ear being cut, so that an accurate cut is possible.

Another type of machine embodies the utilization of a series of circumferentially spaced cutting blades which are not only movable radially, but are rotated about their common axis as well. In general, the ears of corn are fed to the cutting head by a continuous conveying system so that the ears pass through the cutting head in end to end relation. Such machines have a high operational speed. However, because they effect the cutting of the kernels with a high relative movement between the cutting blades and the ear of corn being cut, accuracy of cut is not easily obtained.

The present invention contemplates the provision of an improved cutter head, particularly adapted to be utilized in a reciprocating type corn cutting machine which is capable of a high degree of accuracy of cut. It will be understood that the efficient removal of kernels from the ears of corn, for canning or other purposes, cannot merely be resolved into a question of the number of ears cut by a given machine in a given period of time. The more significant factor is the number of cases recovered from a ton of corn, rather than the time required to remove the kernels. It is obvious that a cutting machine could be provided which would simply remove all of the material close to the base of the cob, so that a 100% recovery of the kernels is obtained. However, the quality of the corn recovered is also an important factor. By cutting the corn too close to the cob, several highly disadvantageous results occur and the quality of the corn is adversely affected. Tests have shown that the embryo at the base of each kernel has a deleterious effect both upon the taste and color of canned corn after a considerable period of time in the can. Consequently, it is important to cut the corn so that the percentage of embryo material in the kernels recovered is reduced to a minimum. Second, the quality of the corn is largely determined by the extent of moisture contained in the kernels recovered and it has been found that the moisture content of a kernel is greater at the tip and reduces toward the base where the embryo is located. Thus, a shallower cut will result in a better quality in the recovered kernels.

It is well known that an ear of corn grows such that the exterior diameter is not disposed in a perfect circle. That is, virtually every ear contains a flat side which is disposed from the theoretical axis of the cob a distance less than the tips of the remaining kernels. In high speed machines, the cut is often made so that the kernels on the flat side are cut too deeply and the kernels on the side opposite thereof are cut too shallowly. Moreover, varietal characteristics differ substantially and many of the hybrid varieties, which are being produced at increasing rates, taper throughout most, if not all, of their longitudinal extent. It has been found that the exterior diameter of these tapering hybrid varieties, as well as others, bear a relation to the depth of the kernel. That is, the greater the diameter of the ear, the greater the depth of the kernel. High speed machines of the rotary type effect cutting of the kernels from the average ear in a third of a second during which time the blades move in a rotary path approximately thirty inches. Therefore, it is apparent that they are incapable of adjusting to accommodate the varying size kernels contained within the tapered hybrid varieties. High speed machines, therefore, cut such corn very inefficiently, perhaps too shallow at the large end and too deep at the small end.

As noted above, the cutting head of the present invention is particularly adapted for use in reciprocating type corn cutting machines. Preferably, the cutting blades of the present cutting head have a total movement of approximately ¼" and in cutting any given ear, only a portion of this movement will be utilized. Thus, with this slight amount of movement, accuracy of cut can be obtained, particularly when utilized with a reciprocating type cutter which individually handles each ear. With high speed operation, such as utilized in present rotary cutters, such sensitivity cannot be obtained due to the operational speeds utilized. That is, rotary cutters effect removal of the kernels in approximately one-third of a second and not only is there relative longitudinal movement between the blades and the corn, but the blades move rotationally as well a distance of some thirty inches. The present cutting head enables the kernels to be cut much more efficiently so that the kernels removed are of a high quality and the recovery percentage quite favorable.

As stated above, heretofore, reciprocating type of machines have usually embodied the provision of a unitary pusher rod assembly which alternatively separates to move one ear through one of the cutting heads during movement in one direction and the next ear through the opposite cutting head during movement in the opposite direction. Such machines can be readily utilized with the cutting head of the present invention and are preferably utilized to obtain the desired sensitivity at the rate of approximately ninety-two ears per minute. This means that approximately forty-six ears are moved through each cutting head during one minute. However, the forty-six ears passing through each cutting head is accomplished in a total time of thirty seconds and the remaining thirty seconds is utilized to return the pusher rod into a position to receive the next ear.

The present invention also contemplates an improved reciprocating type machine which is operable to handle an increased number of ears per minute over that of the conventional prior art reciprocating machine but in which speed of movement of the ears through the cutting head is maintained at the same or reduced rate. Thus, the present invention contemplates a machine in which production is increased and at the same time operational speed is maintained at a sufficiently low level so that the sensitivity of the cutting head is not detrimentally affected. It is contemplated that with the use of the present machine and cutting head, increases of approximately eight to ten cases of canned corn, per ton, can be obtained, due to the increased efficiency in the cut and the increased ear handling rate in conjuction with the decreased feeding rate of the machine.

Accordingly, it is an object of the present invention to provide a machine of the type described having improved means for handling a maximum number of ears per unit time with a minimum rate of movement of the ears through the cutting head per unit time.

Still another object of the present invention is the provision of a machine of the type described having a pair of pusher rods and improved means for reciprocating the pusher rods so that the ears engaged thereby will be fed relatively slowly through the cutting head, but the pusher rods will be returned into a position to receive the next ear at a relatively fast rate.

In connection with the efficient cutting which is obtained by the cutting head of the present invention, for the first time in the history of the corn canning industry, it is possible to effect a selection according to maturity or size of the ears being cut. As was stated above, cut corn is graded by quality according to its moisture content and it has been found that the moisture content is related to the maturity of the corn which, in turn, is related to the diameter size of the ears. That is, in general, the greater the maturity, the greater the diameter of the ear and the lesser the moisture content. Conversely, as maturity decreases, size decreases, and moisture content increases. In conjunction with this observation, it will also be remembered that the size is directly related to the kernel depth. Thus, it is contemplated by the present invention to gage or determine the size of the ear fed to the machine and to subsequently separate the kernels obtained from the larger size ears from the kernels obtained from the smaller size ears. In this way, a separation according to moisture content and hence according to quality, is automatically obtained. While it is within the contemplation of the present invention to provide a separation according to more than two sizes, where separation according to just two sizes is obtained, it has been found that a moisture content difference of as much as ten points is evidenced in the two separations. Thus, with the present invention, this separation would enable the processor to up-grade the kernels from the smaller ears so that he could obtain a better price and to either utilize the other large separation either as the material for the cream constituent, which could be added to the first separation to thereby up-grade the entire production, or to be sold by itself as a corn of less quality.

It can be seen that with the use of the present cutter head, in conjunction with the present machine, a relatively high rate of feed of uncut ears to the machine can be maintained. However, the movement of the ears through the machine is at a sufficiently low speed, such that accurate cutting control is possible. The adjustability features of the present cutting head enables each individual ear to be cut efficiently, so that a maximum recovery is obtained, with a minimum of deleterious material which would tend to reduce the quality. Finally, the present machine serves to automatically effect a separation of the kernels cut according to the size of the ears being cut. This enables the processor to achieve a further recovery in terms of quality, so that the present machine is capable of high capacity operation but yet achieves a maximum recovery and a cut which insures a maximum quality output.

These and other objects of the present invention will become more apparent during the course of the following detailed description and appended claims.

The invention may best be understood with reference to the accompanying drawings wherein illustrative embodiments are shown.

In the drawings:

FIGURE 5 is an enlarged fragmentary rear view of the machine with the back frame wall broken away;

FIGURE 8 is an enlarged fragmentary cross-sectional view taken along the line 8—8 of FIGURE 2;

FIGURE 10 is an enlarged rear elevational view of the cutting head;

FIGURE 11 is an enlarged side elevational view of the cutting head;

FIGURE 12 is a cross-sectional view taken along the line 12—12 of FIGURE 10;

FIGURE 13 is an enlarged fragmentary cross-sectional view taken along the line 13—13 of FIGURE 10;

FIGURE 14 is a schematic view of one link connection arrangement of the variable motion transmitting means of the cutting head;

FIGURE 15 is a graph illustrating the depth of cut for various ear diameters obtained by the link connection arrangement shown in FIGURE 14;

FIGURE 16 is a view similar to FIGURE 14 illustrating another link connection arrangement of the variable motion transmitting means;

FIGURE 17 is a graph similar to FIGURE 15 illustrating the depth of cut for various ear diameters obtained by the link connection arrangement shown in FIGURE 16;

FIGURE 20 is an enlarged side elevational view of one of the knob-actuated adjusting devices for the kernel separation means;

FIGURE 21 is a cross-sectional view taken along the line 21—21 of FIGURE 20;

*General Organization*

Figure 1:
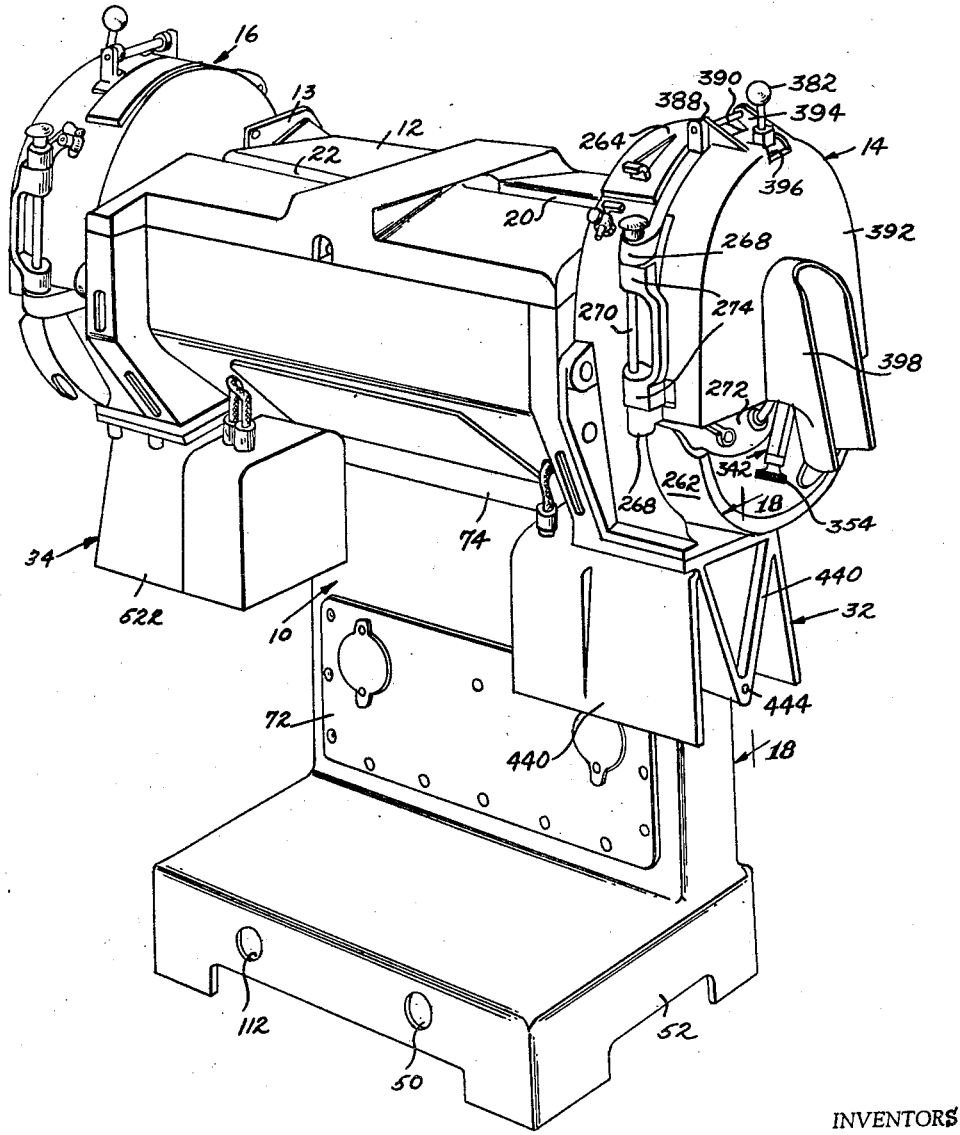
FIGURE 1 is a perspective view of a corn cutting machine embodying the principles of the present invention.
Figure 2:
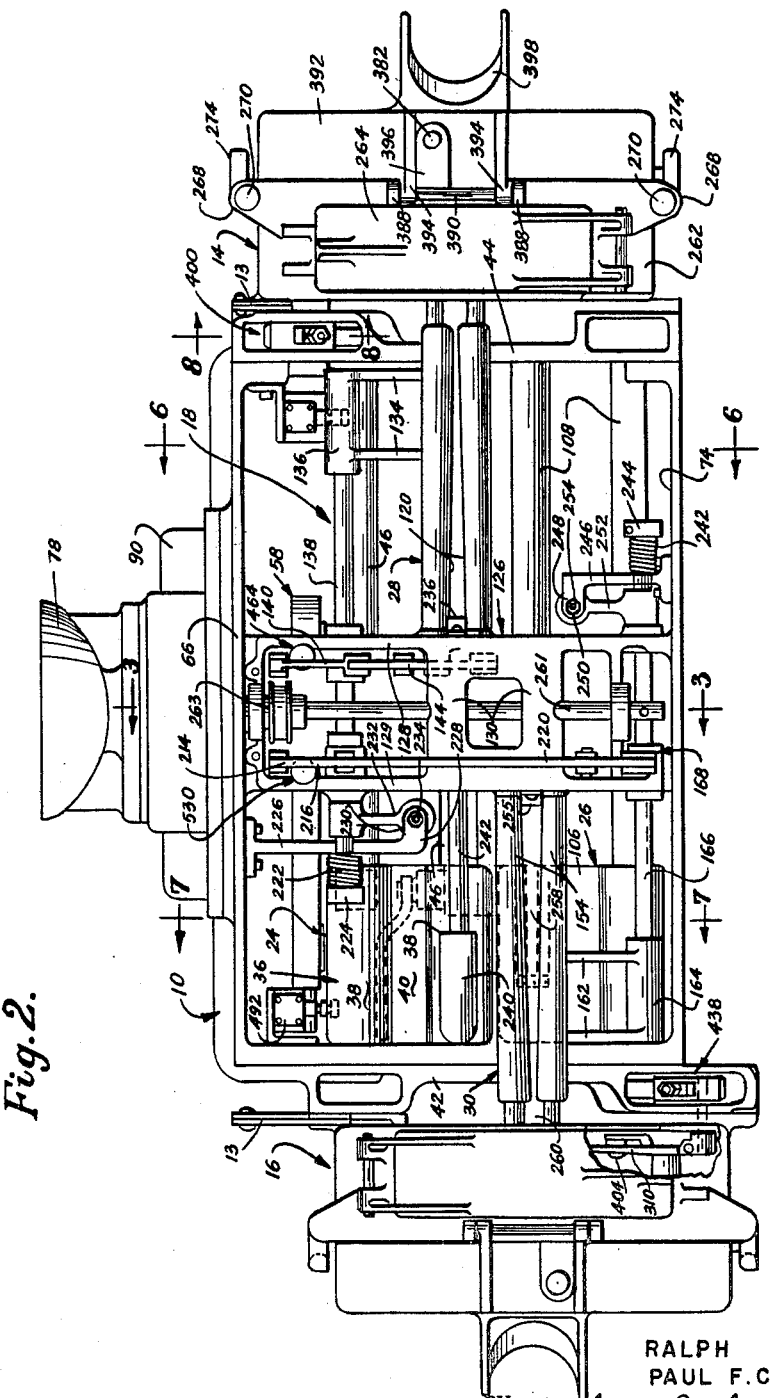
FIGURE 2 is a top plan view of the machine with the ear handling table removed.

As best shown in FIGURES 1–4, the machine of the present invention includes a main frame 10 having a corn ear handling table or cover 13 disposed on its upper surface and mounted for pivotal movement about a rearwardly disposed horizontal longitudinal axis, as by pivot brackets 13. Mounted on the main frame at opposite sides of the table 12 is a pair of cutting heads 14 and 16. An ear-feeding mechanism 18 is carried by the frame beneath the table and is operable to feed successive ears alternately through one head and then the other. As best shown in FIGURE 1, the table includes a pair of laterally offset ear-receiving openings 20 and 22 within which the operator deposits ears to be fed to the cutting heads. The upper surface of the table slopes downwardly and outwardly on opposite sides of each opening and the upper edge surface along one side of each opening is above the upper edge surface along the opposite side to facilitate handling of the ears thereon.

The ear-feeding mechanism 18 includes a first pusher rod assembly 24 movable at a relatively slow speed from a position of engagement with the ear deposited in the opening 20 in a direction toward the cutting head 14 to feed the ear therethrough and returnable at a relatively rapid speed to receive the next ear deposited in the opening 20. A second pusher rod assembly 26, of similar construction, is provided to slowly feed the ear deposited in the opening 22 through the cutting head 16 during the return movement of the pusher bar assembly 24 and to rapidly return to receive the next ear deposited in the opening 22 during the feeding movement of the pusher rod assembly 24.

An ear-centralizing and size-sensing means 28 is associated with the pusher rod assembly 24 to permit entry of the ear disposed in the opening 20, under proper conditions, into a position to be engaged by the pusher rod assembly 24 and fed through the cutting head 14. The ear-centralizing and size-sensing means 28 is operable to resiliently engage the ear about its periphery so as to guide it in properly centered relation into the cutting head 14 during the feeding movement of the pusher rod assembly 24 and to sense the diameter size of each ear fed to the cutting head. A similar ear-centralizing and size-sensing means 30 is associated with the pusher rod assembly 26 and cutting head 16.

A kernel separation assembly 32 is mounted below the cutting head 14 in a position to receive the cut kernels falling by gravity therefrom. The kernel separation assembly 32 is operable to direct the cut kernels along a selected one of a plurality of different paths and is connected with the size-sensing means 28 so that the path of kernel direction will be selected in accordance with the size ear sensed thereby. A similar kernel separation assembly 34 is associated with the cutting head 16 and sensing means 30.

*The Ear Feeding Mechanism*

Figure 3:
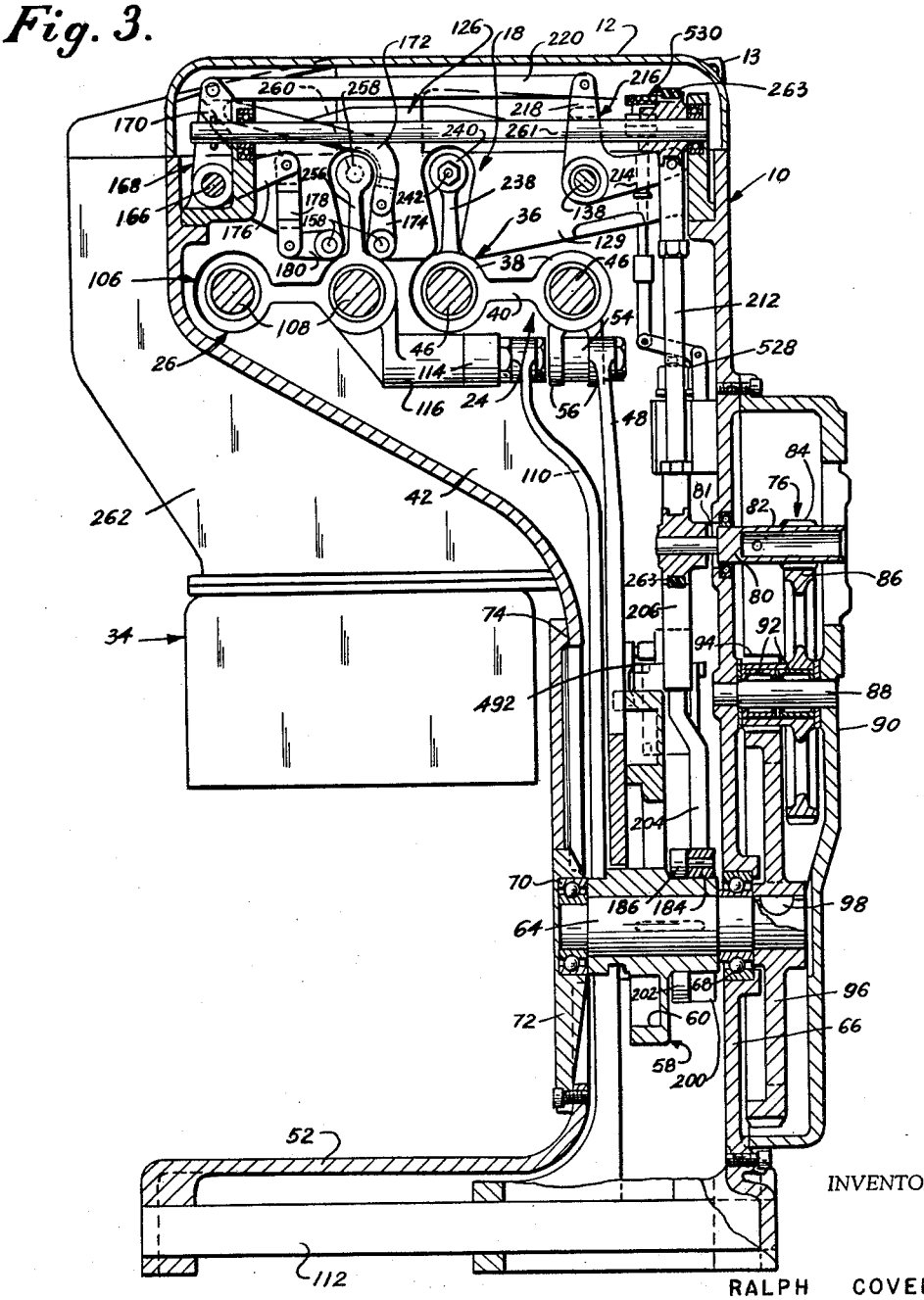
FIGURE 3 is an enlarged cross-sectional view taken along the line 3—3 of FIGURE 2.

As best shown in FIGURE 3, the pusher rod assembly 24 of the ear-feeding mechanism 18 includes a reciprocating carriage 36 preferably constructed of a pair of cylindrical members 38 rigidly interconnected by a horizontal web 40. The main frame 10 includes opposed side walls 42 and 44 having rigidly extending therebetween a pair of horizontally disposed parallel guide bars 46 upon which the cylindrical members of the carriage are slidably mounted.

The carriage 36 is reciprocated along the bars 46 by means of a lever 48 having its lower end pivotally mounted on the main frame, as by a shaft 50, suitably journaled within a lower base portion 52 of the frame and having its axis extending in a direction perpendicular to the axes of the parallel guide bars 46. The lever 48 is thus pivotally mounted for movement in a vertical plane parallel to the axes of the guide bars 46 and has its upper end pivotally interconnected with one end of a link 54, the other end of which is pivotally connected between a pair of depending ears 56 extending from the end of the carriage 46 adjacent the side wall 42.

Figure 4:
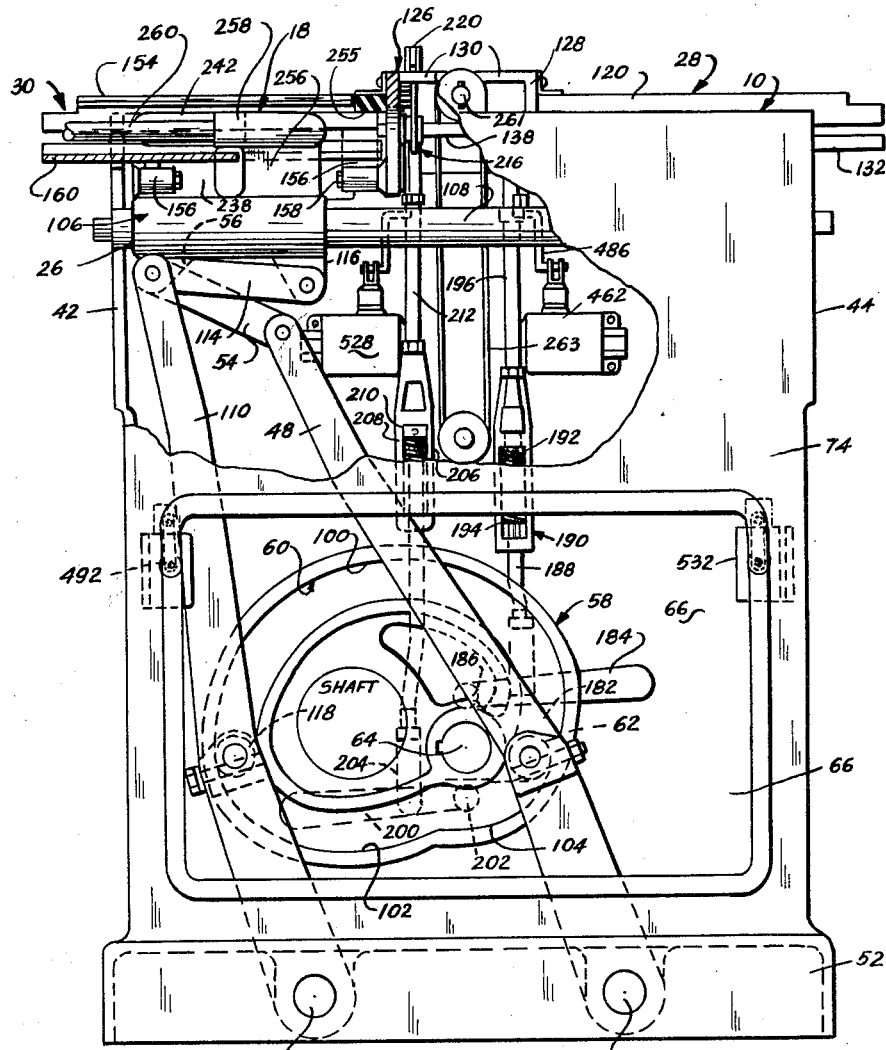
FIGURE 4 is a front elevational view of the machine with certain parts removed and/or broken away for purposes of clearer illustration.

The lever 48 is oscillated by means of a cam, shown in detail in FIGURES 4 and 5 and generally indicated at 58. The cam 58 includes a main cam track 60 arranged to receive a cam follower or roller 62 rotatably mounted on the lever 48 intermediate its ends by any suitable means. The cam 58 is mounted for rotation on the main frame 10 by means of a cam shaft 64 having its rear end journaled within a suitable opening formed in a rear wall 66 of the main frame, as by roller bearings 68, and its forward end journaled, as by roller bearing 70, within a suitable opening formed in a two-piece cover plate 72 suitably removably secured by any suitable means, such as bolts or the like, to a forward wall 74 of the main frame above the base 52 thereof. As best shown in FIGURE 1, the forward wall 74 extends upwardly and forwardly from the cover plate 72 and the area therebelow constitutes a space within which a suitable kernel conveying belt or the like (not shown) is positioned.

The cam 58 is suitably secured to the shaft 64 by any suitable means, such as a key or the like, for rotation therewith and rotary motion is imparted to the shaft through a gear train, generally indicated at 76, by a suitable motor 78 or the like. The drive shaft of the motor 78 is aranged to be detachably secured to a first auxiliary shaft 80 suitably journaled in a suitable opening 81 in the rear wall 66, as by ball bearings 82, or the like. The shaft 80 has a small pinion gear 84 rigidly secured thereto which meshes with a larger pinion gear 86 journaled on a shaft 88 fixed between the rear wall 66 and the rear wall of an auxiliary housing 90, as by pin bearings 92. The large pinion gear 86 has an axially extending hub portion defining a small pinion gear 94 formed thereon which meshes with a cooperating large pinion gear 96 fixed to the end of the cam shaft 64, as by a key 98 or the like. It will be seen that the rotary motion of the motor 78 is transmitted to the cam shaft through the gear train means 76, including the small pinion gear 84 cooperating with the larger pinion gear 86, the second small pinion gear 94 and its cooperating larger pinion gear 96, which is keyed to the cam shaft.

As best shown in FIGURE 4, the cam track 60 is formed so that the carriage 36 will be reciprocated with a relatively slow rate of speed, in a direction toward the associated cutting head 14 and returned in a relatively rapid speed. To this end, the cam track includes a first portion 100 which gradually increases in a distance from the axis of the rotation of the cam shaft operable to effect movement of the carriage toward the cutting head 14. The cam track 60 includes a second portion 102 forming a continuation of the first portion 100, which rapidly descreases in its distance from the axis of rotation for effecting the return of the carriage. Extending between the second portion and the first portion to form a continuous endless track is a third portion 104, which constitutes a sector of approximately 80° and which is equidistant from the axis of rotation. The third portion 104 constitutes a dwell, during which an ear is fed to the machine preparatory to movement of the same through the associated cutting head. The radial extent of the first portion is somewhat greater to the radial extent of the second and third portions combined.

In a like manner, the pusher rod assembly 26 includes the carriage 106 of a construction similar to the carriage 36 mounted on a pair of guide bars 108 for longitudinal reciprocating movement by a lever 110 having its lower end mounted on the frame base 52 for pivotal movement about a transversely extending horizontal axis, as by a shaft 112 suitably fixed to the lower end of the lever and journaled on the frame base in spaced parallel relation to the shaft 50. The upper end of the lever 110 is pivotally connected with one end of a connecting link 114, the opposite end of which is pivoted by a laterally extending apertured boss 116 rigidly secured to one end of the carriage 106. Rotatably mounted on the lever 110 intermediate its ends is a cam roller 118 seated within the cam track 60 and movable by rotation of the cam to impart a cycle of movement to the lever 110 identical with the cycle of movement of the lever 48 but out of phase therewith approximately 180°. Therefore, the carriage 106 will move relatively slowly toward its associated head 16, will be returned rapidly, and will dwell in the returned position momentarily before commencing a slow movement again toward the cutting head 16. The movement of the carriage 106 toward the head 16 takes place during the return movement and dwell of the carriage 36 and vice versa.

Figure 6:
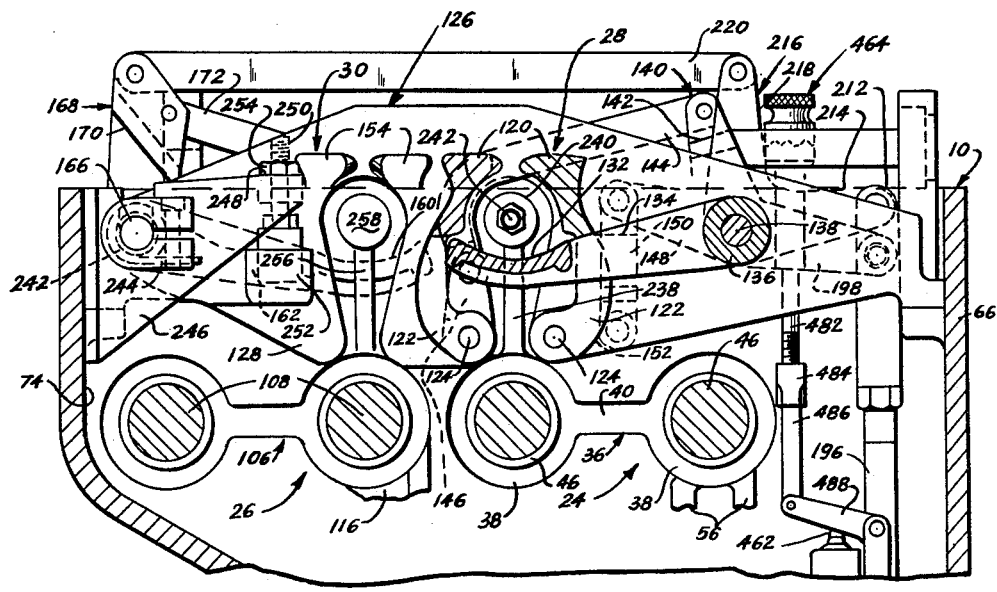
FIGURE 6 is an enlarged fragmentary cross-sectional view taken along the line 6—6 of FIGURE 2.
Figure 7:
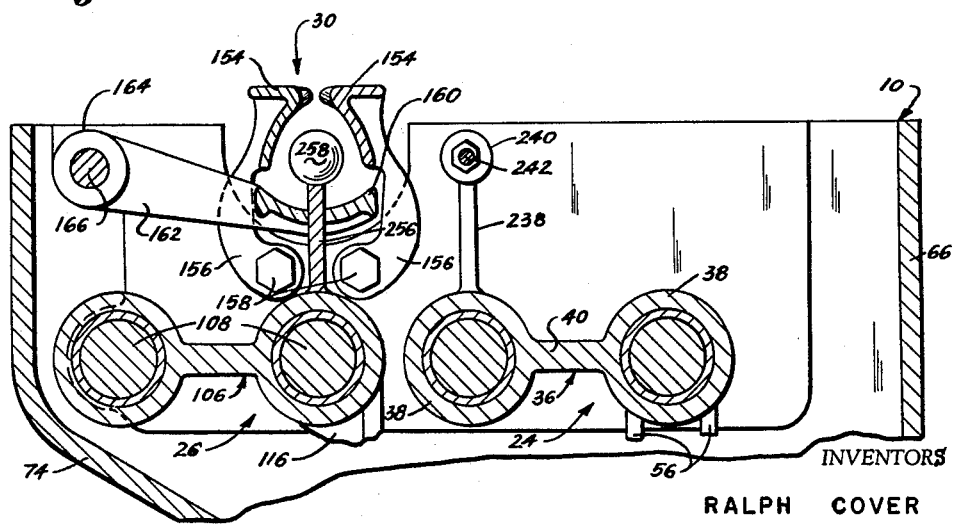
FIGURE 7 is an enlarged fragmentary cross-sectional view taken along the line 7—7 of FIGURE 2.
Figure 9:
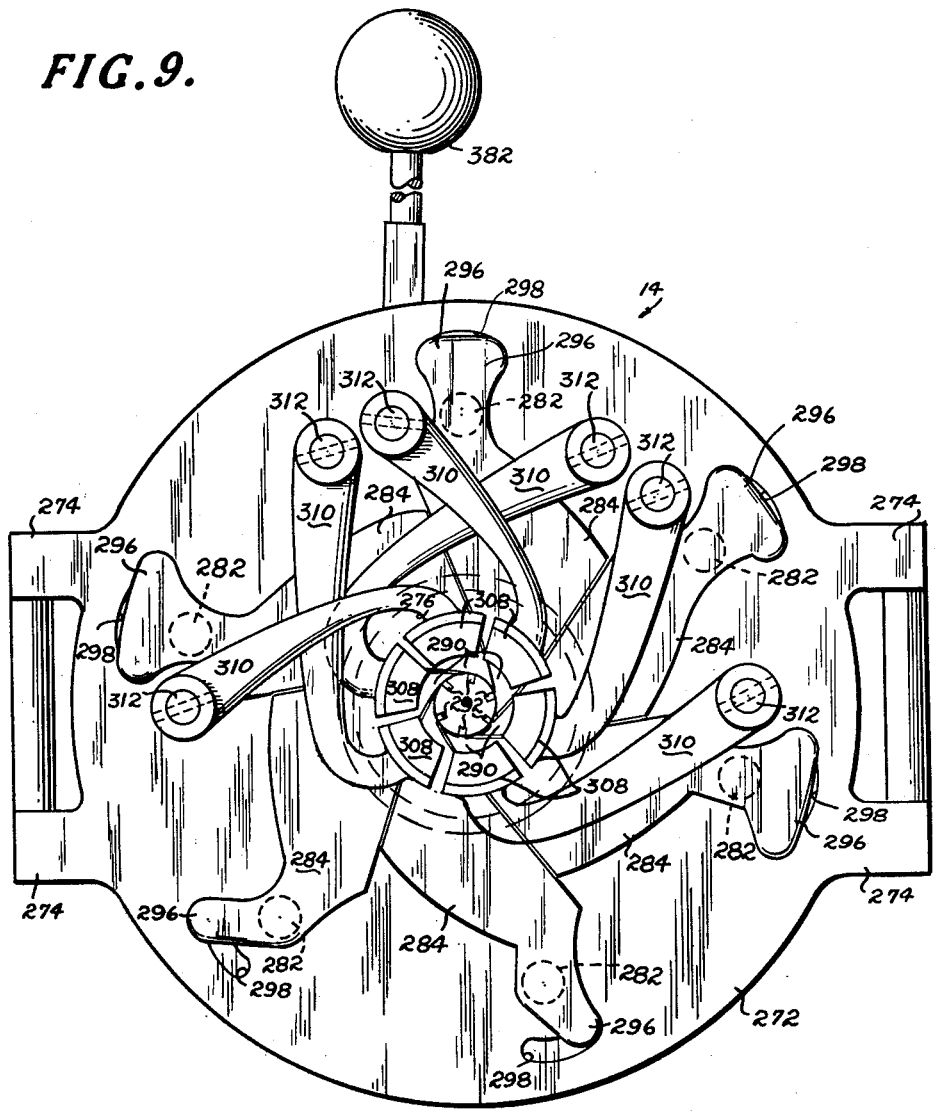
FIGURE 9 is an enlarged front elevational view of one of the cutting heads of the machine.

As best shown in FIGURES 6 and 7, the ear centralizing and size-sensing means 28 associated with the carriage 36 includes a pair of opposed ear-engaging members 120, each including a pair of longitudinally spaced depending apertured legs 122 pivotally secured, as by pins 124 or the like, to the side wall 44 of the main frame and an intermediate frame section 126 rigidly secured between the forward and rearward walls 74 and 66 of the main frame just below the table 12 in a transversely extending position intermediate the side walls thereof. The intermediate section 126 includes spaced vertical plates 128 and 129 rigidly interconnected by cross-plates 130.

The ear-centralizing and size-sensing means 28 also includes a lower ear-engaging member 132 having a pair of longitudinally spaced arms 134 extending laterally therefrom, the outer ends of which are rigidly secured to a cylindrical bearing member 136 suitably fixed on a shaft 138 carried by the associated side wall 44 and the intermediate section 126. The opposed ear-engaging members 120 and lower engaging member 132 are interconnected for pivotal movement together by means of a bell-crank lever 140 secured to the shaft adjacent the vertical plate 128 of the intermediate section 126. The bell-crank lever 140 has an upwardly extending arm 142, the outer end of which is bifurcated to pivotally receive the upper end of an arm 146 fixed to the pivot pin 124 of one of the ear-engaging members 120. The bell-crank lever 140 also includes a horizontally inwardly extending arm 148 having its outer end pivotally connected between the bifurcated end of the connecting link 150, the opposite end of which is bifurcated to pivotally receive one end of an arm 152 extending horizontally from and secured to the pivot pin 124 of the other ear-engaging member 120.

The ear-centralizing and size-sensing means 30 associated with the cutting head 16 includes upper ear-engaging members 154 similar to the members 120 previously described, each having a pair of longitudinally spaced downwardly extending legs 156. Pivot pins 158 are rigidly secured to the legs 156 and journaled in the associated side wall 42 of the main frame and the vertical plate 129 of the intermediate section 126 respectively. A lower ear-engaging member 160 includes a pair of longitudinally spaced arms 162 extending horizontally therefrom and rigidly secured to a cylindrical bearing member 164 fixed to a longitudinally extending shaft 166 suitably mounted in the end wall 42 of the main frame and the intermediate section 126. The ear-engaging members 154 and 160 are mounted for pivotal movement together by means of a bell-crank lever 168 having an upwardly extending arm 170 bifurcated to pivotally receive one end of a connecting link 172, the other end of which is bifurcated and pivotally receives the upper end of an arm 174 rigidly secured to the pin 158 of one of the ear-engaging members 154. The bell-crank lever 168 includes a second generally horizontally extending arm 176, the outer end of which is pivotally connected to the upper bifurcated end of a connecting link 178, having its lower end bifurcated to pivotally receive the outer end of a horizontally extending arm 180 rigidly secured to the pin 158 of the other ear-engaging member 154.

The ear-engaging members 120 of the ear-centralizing and size-sensing means 28 are arranged to be moved into an open position to receive an ear of corn during the dwell of the associated carriage 36 by a motion-transmitting mechanism which will now be described. Formed on the cam 58 on the side thereof opposite from the cam track 60 is an ear-engaging member opening cam surface 182. Pivotally mounted on the rear wall 66 of the main frame 10 is one end of a cam follower arm 184, the opposite end of which has a cam roller 186 journaled thereon. Pivotally connected with the cam follower arm 184 intermediate its end, is the lower bifurcated end of a connecting rod 188 which extends upwardly through a spring-carrying member 190 for longitudinal sliding movement with respect thereto. The spring-carrying member 190 includes upper and lower end walls which are centrally aperture to slidably receive the connecting rod 188. A helical coil spring 192 surrounds the upper end of the connecting rod and has its upper end engaged with the upper wall of the member 190 and its lower end engaged with a collar 194 longitudinally adjustably secured by any suitable means to the upper end portion of the connecting rod. The spring-carrying member has its upper end fixedly connected to the lower end of a second connecting rod 196, the upper end of which is bifurcated and pivotally secured to the outer end of a horizontally extending arm 198 of the bell-crank lever 140 fixed to the shaft 138.

In a like manner, the ear-engaging members 154 are moved into an open position by means of a second cam follower arm 200 having one end pivotally mounted on the rear wall 66 of the main frame 10 and a cam roller 202 journaled on its opposite end for engagement with the cam surface 182. Pivotally mounted intermediate the ends of the cam follower arm 200 is the bifurcated lower end of a connecting rod 204, the upper end of which extends through a spring-carrying member 206. The member 206 includes upper and lower centrally apertured end walls through which the connecting rod 204 is slidably mounted. A coil spring 208 is mounted in surrounding relation to the connecting rod between the end walls of the member 206 and has its lower end in engagement with the lower wall of the member 206 and its upper end in engagement with a collar 210 longitudinally adjustably secured to the connecting rod 204 by any suitable means. The upper end of the spring-carrying member 206 is connected with the lower end of a second connecting rod 212, the upper end of which is bifurcated and pivotally connected to the outer end of a horizontally extending arm 214 of a bell-crank lever 216 journaled on the shaft 138. The bell-crank lever 216 includes a second upwardly extending arm 218 bifurcated to pivotally receive one end of a connecting link 220, the other end of which is pivotally connected to the birfurcated upper end of the arm 170 of the bell-crank lever 168.

The ear-engaging members 120 and 132 associated with the cutting head 14 are resiliently urged into a closed or innermost position by means of a coil spring 222 surrounding one end of the shaft 138 and having one of its ends fixed thereto, as by a collar 224 adjustably secured to the shaft, and its other end secured to a horizontally extending bracket 226 rigidly secured, as by bolts or the like, to the rear wall 66 of the main frame 10 and suitably apertured to receive the shaft 138. The outer end of the bracket 226 includes a laterally offset portion 228 through which a vertically extending bolt 230 is threadedly engaged. The lower headed end of the bolt 230 is arranged to engage the outer end of an arm 232 rigidly secured to the shaft 138. The innermost limiting position of the ear-engaging members may be varied by turning the bolt 230, and the latter is secured in any position of adjustment by means of a nut 234 threaded thereon and arranged to be tightened into engagement with the laterally extending portion of the bracket. Preferably, a shock-absorbing rubber block 236 is secured to the plate 128 in a position to be engaged by the inner ends of the members 120.

It will be seen that the ear-engaging members 120 and 132 associated with the carriage 36 are moved from their normally closed or inward limiting position to an open or outer limiting position against the action of the spring 222 to receive an ear of corn by operation of the cam surface 182, cam follower arm 184, connecting rod 188, spring 192, connecting rod 196 and bell-crank lever 140. The cam surface 182 is related to the cam track 60 such that the ear-engaging members 120 will be moved into their open or outer limiting position to receive an ear of corn during the dwell of the associated carriage 36 prior to its operating stroke for moving the ear through the associated cutting head 14. In order to effect movement of the ear gripped by the associated ear-engaging members 120 and 132, the pusher rod assembly 24 includes a vertical web 238 extending upwardly from one of the cylindrical members 38. Rigidly formed on the upper end of the web 238 is a pusher head 240 fixedly receiving the inner end of a pusher rod 242 having its outer end formed with a suitable central prong for piercingly engaging the end of the ear of corn. The lower member 132 is suitably slotted to receive the web 238 when disposed in its forwardmost position.

In a like manner, the ear-engaging members 154 and 160 associated with the cutting head 16 are resiliently urged into a closed or innermost limiting position by a coil spring 242 surrounding the end of the shaft 166 and having one end rigidly secured thereto as by a collar 244 adjustably fixed to the shaft. The other end of the coil spring is fixed to a bracket 246 secured to the front wall 74 of the main frame, as by bolts or the like, and suitably apertured to receive a shaft. The outer end of the bracket 246 includes a laterally extending portion 248 having a vertically extending bolt 250 threadedly mounted therein. The lower headed end of the bolt is arranged to engage the outer end of an arm 252 fixed to the shaft 166. The closed or inward limiting position of the ear-engaging members 154 and 160 may be varied by turning the bolt 250 and the latter is fixed into any position of adjustment by means of a nut 254 threaded on the upper end thereof and arranged to be tightened against the upper surface of the laterally extending portion 248 of the bracket 246. Preferably, a shock-absorbing rubber block 255 is secured to the plate 129 in a position to be engaged by the inner ends of the members 154.

As before, the ear-engaging members 154 and 160 associated with the cutting head 16 are moved from their normally closed or inner limiting position against the action of the spring 242 to an open or outer limiting position to receive an ear of corn by means of the cam surface 182, cam follower arm 200, connecting rod 204, spring 208, connecting rod 212, bell-crank lever 216, connecting link 220 and bell-crank lever 170. The cam follower arm 200 is related to the cam surface 182 so that the associated ear-engaging members 154 and 160 will be moved into an open or outward limiting position when the associated carriage 106 is disposed in its dwell prior to its movement toward the associated cutting head. In order to effect movement of the ear engaged within the ear-engaging members by the carriage, the pusher rod assembly 26 includes a vertical web 256 integral with the inner cylindrical member of the carriage and extending upwardly therefrom. A pusher head 258 is integrally formed on the upper end of the web 256 and has the inner end of a pusher rod 260 rigidly secured thereto. The outer end of the pusher rod 260 is formed with a suitable central prong to piercingly engage the end of the ear gripped within the ear-engaging members 154 and 160.

In order to permit the ear feeding mechanism 18 to be manually moved, as by a hand crank or the like, a shaft 261 is suitably journaled on the intermediate frame section and drivingly connected with the shaft 80 by a belt and pulley arrangement or the like 263.

Cutting Head

Since both of the cutting heads 14 and 16 are of identical construction, a description of one should suffice to give an understanding of both. The cutting head 14 includes a main casing 262 of generally cylindrical construction having one end thereof suitably secured to the adjacent end wall of the main frame by any suitable means, such as bolts or the like, and disposed with its axis concentric with the axis of the associated pusher rod. Preferably, the upper end of the casing 262 includes an access opening which is closed by a door 264 pivoted at one side to the casing. The lower portion of the casing is formed into a general funnel-shaped configuration and includes a lower discharge opening 266 through which the cut kernels fall by gravity.

Extending outwardly from each side of the casing 262 is a pair of mounting ears 268 apertured to receive a suitable mounting pin 270. A cutting head plate or support 272 of general disk-shape configuration has a pair of spaced interconnected mounting ears 274 extending from each side thereof and apertured to receive the pins 270 extending through the mounting ears 267 of the casing. It will be understood that by removing either of the pins 270, the cutting head support 272 may be pivoted with respect to the casing about the other.

Referring now more particularly to FIGURES 9–13, the head support 272 includes a central opening 276 through which the ears of corn are fed by the ear-feeding means 18, previously described. A circular boss 278 is formed on the rear surface of the support 272 and has a plurality of cylindrical bearing sleeves 280 extending therefrom in equal circumferentially spaced relation around the axis of the opening 276. Extending through each bearing sleeve 280 and a suitable aperture formed in the boss 278 is a stub shaft 282 having the forward end thereof rigidly secured to a cutting blade mounting arm 284 and the rear end thereof fixedly secured to a collar 286 by any suitable means. Each blade mounting arm 284 has detachably mounted on the inner end thereof, as by bolts 288 or the like, a cutting blade 290, which is preferably constructed in the manner indicated in the United States patent to cover, No. 2,141,346, issued December 28, 1938. The six cutting blades 290 on the mounting arms 284 extend in a general longitudinal direction and are disposed to cut in a substantial circle concentric with the axis of the opening 276. Disposed rearwardly of each cutting blade is a longitudinally extending runner 292 of the type described in the aforementioned patent.

The mounting arms 284 are connected for movement together between inner and outer limiting positions by a series of connecting links 294. To this end, each of the mounting arms 284 includes an extension 296 directed outwardly from the associated stub shaft 282. The head support adjacent each extension is provided with an elongated slot 298 arcuate about the axis of the associated shaft 282. A bolt 300 extends through each slot 298 and is threaded into the outward extension of the associated arm and carries adjacent its headed end a ball 302. Each connecting link 294 is provided with a socket 304 at each end thereof to engage a ball 302 carried by the associated bolt. The socket-carrying end portions of each connecting link 294 are adjustable longitudinally by any suitable means, such as a turn-buckle 306 or the like. It will be understood that a connecting link 294 is extended between each pair of adjacent mounting arms 284. However, since five connecting links are sufficient to interconnect all six of the mounting arms for movement together, two of the adjacent extensions 296 have only a single bolt 300 connected therewith and no connecting link is provided therebetween. It will be seen that by this arrangement of connecting links, all of the mounting arms carrying the cutting blades 290 are movable together, between inner and outer limiting positions, so as to accommodate ears of various sizes.

Disposed closely adjacent the cutting blades 290 is a plurality of equal circumferentially spaced depth gage elements 308 arranged to engage the ear prior to its contact with the cutting blades. Preferably, four or more depth gage elements 308 are utilized and, as shown, six are provided. Each of the depth gage elements 308 has one end of a generally hook-shaped mounting arm 310 rigidly secured thereto. Each of the mounting arms 310 has a shaft 312 rigidly secured thereto and extending through a suitable aperture formed in the circular boss 278 and in integral bearing sleeves 313 extending from both sides of the support. Four of the mounting arm shafts 312 are disposed within the upper half of the mounting plate in equal circumferentially spaced relation and the mounting arms 310 associated therewith are generally oriented in the same relation with respect to each other. The remaining two mounting arm shafts 312 are also disposed in the upper sector of the head support 272 so as to retain the space below the cutting blades 290 free from structure which would be disposed within the path of movement of the kernels falling by gravity after they have been cut. The elimination of permanent structure below the cutting blades eliminates the possibility of material accumulation which would lead to unsanitary conditions within the cutting head. It will be noted that the remaining two mounting arm shafts 312 are disposed within the head support adjacent the intermediate two of the first four mentioned shafts and the hook-shaped mounting arms 310 thereof are disposed in a general opposite direction from the direction of the extent of the remaining four mounting arms.

The depth gage elements 308 carried by the mounting arms 310 are connected for movement together between inner and outer limiting positions in the following manner. The four equally spaced arms have collars 314 mounted on the rear end of their shafts, which collars have arms 316 extending radially outwardly therefrom. A connecting link 318, similar to the connecting links 294 previously described, are connected between each pair of adjacent mounting arms and, as clearly shown in FIGURE 10, three such connecting rods are shown. Each of the remaining two mounting arms has secured to the rear ends of their shafts a collar 320 having a sector of gear teeth 322 formed thereon. The gear teeth 322 are arranged to mesh with gear teeth of a sector 324 formed on a second collar 326 secured to the adjacent shaft 312. In this way, all of the depth gage elements are movable together between inner and outer limiting positions.

A significant feature of the present cutting head is the provision of means for transmitting the movement of the depth gage elements to the cutting blades so as to obtain any desired rate of movement of the latter within a wide range of adjustment. To this end, there is provided a control lever 328 having one end rigidly secured to one of the collars 286 of the cutting blade mounting arm shafts 282. A second control lever 330 disposed generally parallel with the control lever 328 has one end thereof secured to one of the toothed collars 320 fixed to the end of a depth gage mounting arm shaft 312.

The outer end of each control lever has connected therebetween a variable motion-transmitting mechanism, generally indicated at 332, which is readily adjustable to permit a wide variation in the characteristic movement of the cutting blades for a given movement of the depth gage elements. As shown, the outer end of the depth gage control lever 330 is enlarged and provided with a plurality of spaced apertures, three apertures being illustrated and designated by the letters A, B and C respectively. A connecting link 334 has one bifurcated end apertured for selective connection to one of the apertures A, B and C, by a quick entry and release pivot pin of a known construction, indicated at 336. The opposite end of the connecting link 334 is bifurcated to receive therebetween a plate 338 pivoted to a pin 340 adjacent one end and provided with a plurality of spaced apertures selectively registrable with an aperture formed in the bifurcated end of the connecting rod. A pin 341, similar to the pin 336, is provided to engage within the selected registering apertures. While any number of apertures may be provided within the pivoted plate 338, as shown, there are eight such apertures which are indicated respectively by the letters D, E, F, G, H, I, J and K.

Referring now more particularly to FIGURE 13, the pivoted blade 338 is connected to the opposite end of the blade control lever 328 through an adjustment device, generally indicated at 342. The adjustment device includes a block 344 having a pair of spaced arms 346 extending longitudinally outwardly therefrom. The outer ends of the arms 346 are provided with trunnions 348 arranged to engage within suitable apertures formed in the bifurcated outer end of the control lever 328. The block 344 is centrally apertured to receive a stem 350 threaded at one end within a slide member 352 and having a knurled knob 354 secured to its opposite end outwardly of the block 344. The stem 350 is secured within the block against longitudinal movement by any suitable means, such as a collar 356, engaging the inner end of the block. Preferably, the inner surface of the knob 354 is notched, as at 358, at circumferentially spaced positions to receive a ball 360 slidably mounted within a bore 362 formed in the block in parallel spaced relation to the central aperture therein. The ball 360 is spring-urged outwardly by any suitable means, such as a coil spring 364 seating within the bore 362 and engaging the ball 360. The slide member 352 has its upper and lower surfaces grooved adjacent one end portion thereof, as indicated at 366, to receive the spaced arms 346 of the block and the opposite end thereof is bifurcated to receive therebetween the pivoted plate 338. It will be understood that a quick coupling pin 368, similar to the pin 336 previously described, is preferably utilized to selectively connect the apertured bifurcated end of the slide member 352 in any one of the apertures formed in the pivoted plate.

It will be seen that by turning the adjusting knob 354, the distance between the trunnions 348 and coupling pin 368 may be suitably varied. The spring-pressed ball 360 seating within the notches 358 serves to retain the adjusting device 342 in different positions of adjustment. In order to indicate the position of adjustment of the device, the upper surface of the slide member defined by the upper groove 366 is calibrated with the letters L, M, N, O, P, Q, R, S, T, U, V and W.

As best shown in FIGURE 10, the cutting blades, as well as the depth gage elements connected therewith, are resiliently urged inwardly by means of a tension spring 370 having one end secured to a pin 372 fixed to the support and its other end connected with a plate 374. The plate 374 is provided with a plurality of apertures 376 and a hook-like handle 378. A pin 380, having an annular groove adjacent its upper end, is rigidly secured to the control link 328 intermediate its ends and the plate 374 is connected therewith by selective engagement of one of the apertures 376 over the pin 380 and in the annular groove therein. In this way, the tension exerted by the spring 370 may be varied by selectively engaging the pin within any one of the holes provided.

It will be understood that in addition to the movement of the cutting blades in response to the movement of the depth gage elements, a manual movement may also be effected. To this end, one of the cutting blade mounting arm shafts 282 has a hand lever 382 extending from the collar 286 fixed to the end thereof. A stop member 384 is adjustably secured to the support, as by bolts 385, in the path of movement of the hand lever to limit the inward movement of the cutting blades and depth gage elements under the action of the spring 370. The outward movement of the cutting blades and depth gage elements is limited by a stop disk 386 mounted on the shaft 282 adjacent the adjusting device in a position to engage the side of the slide member 352 thereof.

Extending from the upper end of the casing 262 is a pair of horizontally spaced ears 388 apertured to receive a pivot pin 390. A cover plate 392 has a pair of spaced ears 394 formed on the upper end thereof to receive the pivot pin 390 between the ears 388 of the casing. The cover plate includes a slot 396 through which the hand lever 382 extends when the cover plate is in operative position, so that the cutting blades and depth gage elements may be moved manually from the exterior of the machine. The cover plate is centrally apertured and includes a cylindrical chute construction 398 which extends within the opening of the mounting plate to receive the cobs issuing from the cutting blades and to direct the same downwardly. It will be understood that any suitable means may be provided to handle the cobs discharging from the chute.

In order to prevent the feeding of an ear by the ear-feeding means in the event that the preceding ear should become clogged within the cutting head to thereby prevent proper introduction of the next subsequent ear, means generally indicated at 400 is provided to prevent the ear-engaging members from opening in the event that the depth gage arms fail to close after passage of the ear therein. As best shown in FIGURE 8, the means 400 includes an arm 402 having a rounded portion 404 extending laterally from the outer end thereof and disposed in the path of inward movement of one of the depth gage mounting arms 310 of the cutting head. The inner end of the arm 402 is secured to one end of a stub shaft 406, suitably journaled within an extension housing 408 formed in the adjacent end wall 44 of the frame.

Secured to the shaft 406 between the end wall and the extension housing 408 is a short arm 410 having a bifurcated outer end provided with a pivot pin 412. The pivot pin 412 is transversely apertured, as indicated at 414, to threadedly receive the upper threaded end of a connecting rod 416. A nut 418 is threaded on the upper end of the connecting rod 416 in engagement with the pivot pin 412 to lock the same in different positions of longitudinal adjustment. The lower end of the connecting rod 416 is reduced, as at 418, and extends through a transverse aperture 420 formed in a pivot pin 422 journaled intermediate the ends of a resilient locking arm 424. The inner end of the locking arms 424 is pivoted, as by shaft 426, within the extension housing 408 of the main frame and the outer end thereof is provided with a notched abutting surface 428. The locking arm 424 is urged upwardly by a spring 430 having its upper end connected with the arm and its lower end seated within a socket 432 formed in the extension housing 408. The spring 430, which is considerably lighter than the spring 370 of the cutting head, urges the notched abutting surface 428 of the locking arm upwardly into a position to engage the outer end surface 434 of a cooperating locking arm 436 rigidly secured to the shaft 138, which controls the operation of the associated ear-engaging members 120 and 132. A means 438, similar to the means 400, is provided between the cutting head 16 and its associated shaft 166.

It will be seen that so long as the depth gage mounting arms 310 are moved into their innermost limiting position after the passage of the ear therethrough, the lever arm 402 will be moved downwardly therewith, which in turn effects a movement of the locking arm 424 away from the locking arm 436 against the action of the spring 430, through the arm 410 and connecting rod 416, thus permitting the shaft 138 (or 166) to be rotated in response to the actuation of the bell-crank lever 140 (or 170) by engagement of the cam surface 182 with the cam follower arm 184 (or 200).

*Separation Assembly*

Figure 19:
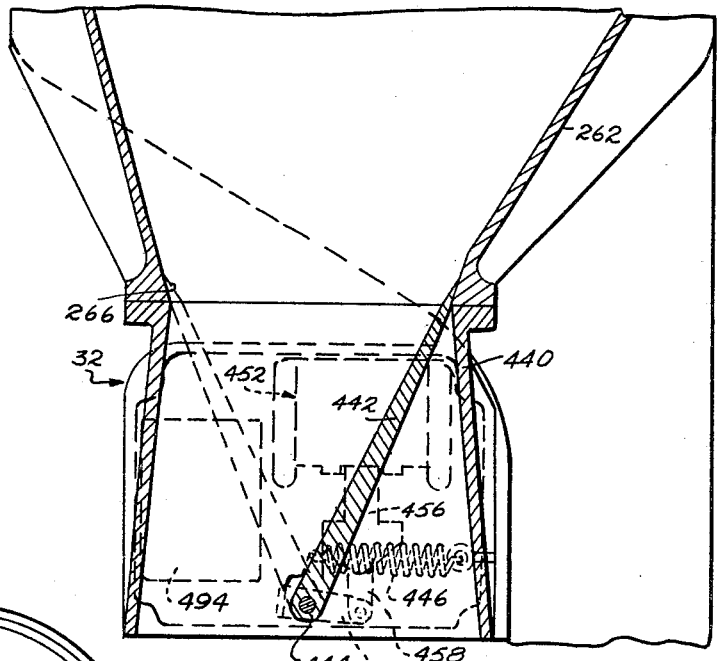
FIGURE 19 is a cross-sectional view taken along the line 19—19 of FIGURE 18.

As indicated above in the general description of the present machine, a separation assembly 32 is provided adjacent the cutting head 14 for effecting a separation of the kernels cut from ears fed thereto of a diameter above a predetermined size and below a predetermined size. To this end, a separation housing 440 is mounted below the discharge opening 266 of the casing 262 to receive the kernels passing therethrough, as shown in FIGURE 19. Mounted within the housing 440 is a deflector gate 442 having a shaft 444 extending through the lower end thereof and journaled in the lower end of the housing 440. The upper end of the deflector gate 442 is resiliently urged into engagement with one wall of the upper end of the casing by a coil spring 446 having one end thereof secured to the housing 440 and the opposite end thereof secured to the outer end of an arm 448 of a bell-crank 450 secured to one end of the shaft 444. It will be observed that with the deflector gate urged into its limiting position by the spring 446, the kernels passing from the discharge opening of the casing into the housing will be deflected toward one side of the housing, so as to be deposited or to pass from the lower end of the housing onto a suitable conveyor (not shown) or the like, at one side of the housing. In order to move the deflector gate into an opposed position, wherein the kernels are directed to the opposite side of the housing, there is provided a solenoid, generally indicated at 452. The solenoid includes a coil 454 having a plunger 456 slidably mounted therein. The lower end of the plunger 456 is pivotally connected with one end of a link 458, the opposite end of which is connected with the outer end of an arm 460 formed on the bell-crank 450. It will be seen that by energizing the coil of the solenoid, the deflector gate will move so that its upper end will engage the opposite wall of the lower end of the casing, thereby directing the kernels passing therethrough to the opposite side of the housing.

Energization of the solenoid 452 is controlled by the operation of the ear-centralizing and size-sensing means associated with the cutting head. Since the ear-engaging members 120 and 132 are moved simultaneously with the shaft 138, associated with the cutting head 14, energization of the solenoid can be made dependent upon the rotative position assumed by the shaft 138 when the ear is engaged by the ear-engaging members. To this end, a microswitch 462 is associated with the shaft 138 and is carried by the main frame for operation in response to the turning movement of the shaft. Preferably, the microswitch 462 is of the normally open type which is closed when actuated.

In order to actuate the microswitch, a micrometer adjustment device, generally indicated at 464, is provided which includes a sleeve member 466 having a pivot pin 468 extending laterally therefrom intermediate its ends arranged to be disposed within a suitable aperture formed in the arm 198 of the bell-crank lever 140 fixed to the shaft 138. As best shown in FIGURES 20 and 21, one end of the sleeve member 466 is enlarged, as indicated at 470, and has one end of a knurled knob 472 mounted in abutting relation thereto. The adjacent surface of the knurled knob is provided with circumferential notches 474 within which a ball 476 is arranged to engage. The ball is mounted within a parallel bore 478 formed in the sleeve member and is resiliently urged outwardly of the bore by means of a spring 480 disposed within the bore and engaging the ball. Secured to the knob 472 is one end of a threaded stem 482 which extends outwardly through the sleeve member 466 and has its opposite end threaded within a threaded boss 484 formed on the outer end of a laterally offset bar 486. The opposite end of the bar is pivotally connected with one end of a connecting link 488, the opposite end of which is pivotally connected with a bracket secured to the end wall of the main frame. The connecting link has a lateral projection 490 formed thereon intermediate its ends for engagement with the microswitch to actuate the same.

It will be seen that when the ear-engaging members 120 and 132 are open as a result of the cam surface 182 engaging the cam roller 186, bell-crank lever arm 198 will be moved upwardly, which in turn will effect an upward movement of the micrometer adjusting device 464. Thus, the normally opened microswitch 462 will be actuated. When the cam surface 182 terminates to permit the bell-crank lever arm 198 to again move upwardly, the associated ear-engaging members 120 and 132 will be moved resiliently inwardly until they assume gripping contact with the ear disposed therein. It will be seen that by turning the knob 472 of the adjusting mechanism, the microswitch 462 may be made to remain actuated for any given size of ear gripped within the ear-engaging members. Once the adjusting device is set, the microswitch 462 will be actuated so long as the ear gripped by the ear-engaging members is of a size greater than that for which the device was originally set. Where ears of a lesser size are gripped by the ear-engaging members, the microswitch will remain open.

The microswitch 462 is thus effective to be either actuated or to remain open during the feeding cycle just prior to the beginning of the feeding stroke and in order to effect energization of the solenoid coil 454 in response to the actuation of the microswitch, to properly position the deflector gate 442 for the size ear being handled, there is provided a second microswitch 492 and a relay 494. The second microswitch includes two pairs of contacts, one pair of which is normally opened and arranged to be closed upon actuation of the microswitch, while the other pair of contacts is normally closed and arranged to be opened upon actuation. The microswitch 492 is positioned so that it will be actuated at the beginning of the feeding stroke of the cycle. While it will be understood that the microswitch may be actuated by any number of instrumentalities which are disposed within a given position during this period in the cycle, as shown, the microswitch is positioned to be engaged by the control lever 110 associated with the other cutting head 16. It will be noted that when the control lever 48 of the cutting head 14 is disposed in a position to begin its operative stroke, the other control lever 110 is disposed in an opposite position after its stroke has been completed. Since this is a limiting position for the other control lever, the microswitch 492 may be conveniently placed to be engaged thereby.

Referring now to the wiring diagram illustrated in FIGURE 22, the solenoid is connected to be energized in response to the actuation of the microswitches 462 and 492 in the following manner. The diagram includes three main power lines which come from a suitable three-phase source of electricity to a main switch 496. From the main switch, there are suitable lines 498, 500 and 502 which lead to the motor 78 to energize the same. The main line 498 has a lead 504 extending therefrom to one side of the coil of the solenoid and a parallel lead 506 to one contact of each pair of contacts of the microswitch 492. The normally opened pair of contacts has a lead 508 connected to its other contact, which is in turn connected with one side of the microswitch 462. A lead 510 is connected with the other side of the microswitch 462 to one side of the coil of the relay 494. A parallel lead 512 is connected with one of a pair of contacts of the relay 494, the other of which is connected to the other contact of the normally closed pair of contacts of the microswitch 492, as by a lead 514. The opposite end of the coil 454 of the solenoid has a lead 516 extending therefrom to one of a second pair of contacts of the relay and the other contact of the pair and the opposite end of the coil of the relay are connected in parallel to the main line 500 through leads 518 and 520.

It will be understood that a similar separation assembly 34 is disposed adjacent the other cutter head 16 and since it is identical with the assembly 32, a description of the same is not believed to be necessary. Suffice it to say that the assembly 34 includes a housing 522 having a deflector gate 524 normally spring-urged into one position and actuated into an opposite position by a solenoid 526. A normally opened microswitch 528 is operatively connected with the bell-crank lever 170, which simultaneously moves the associated ear-engaging members 154 and 160 by a micrometer adjusting device 530. A second microswitch 532, including a pair of normally open contacts and a pair of normally closed contacts, is positioned on the main frame to be actuated by engagement of the control lever 48 therewith. Associated with the microswitches 528 and 532 is a relay 534.

Figure 22:
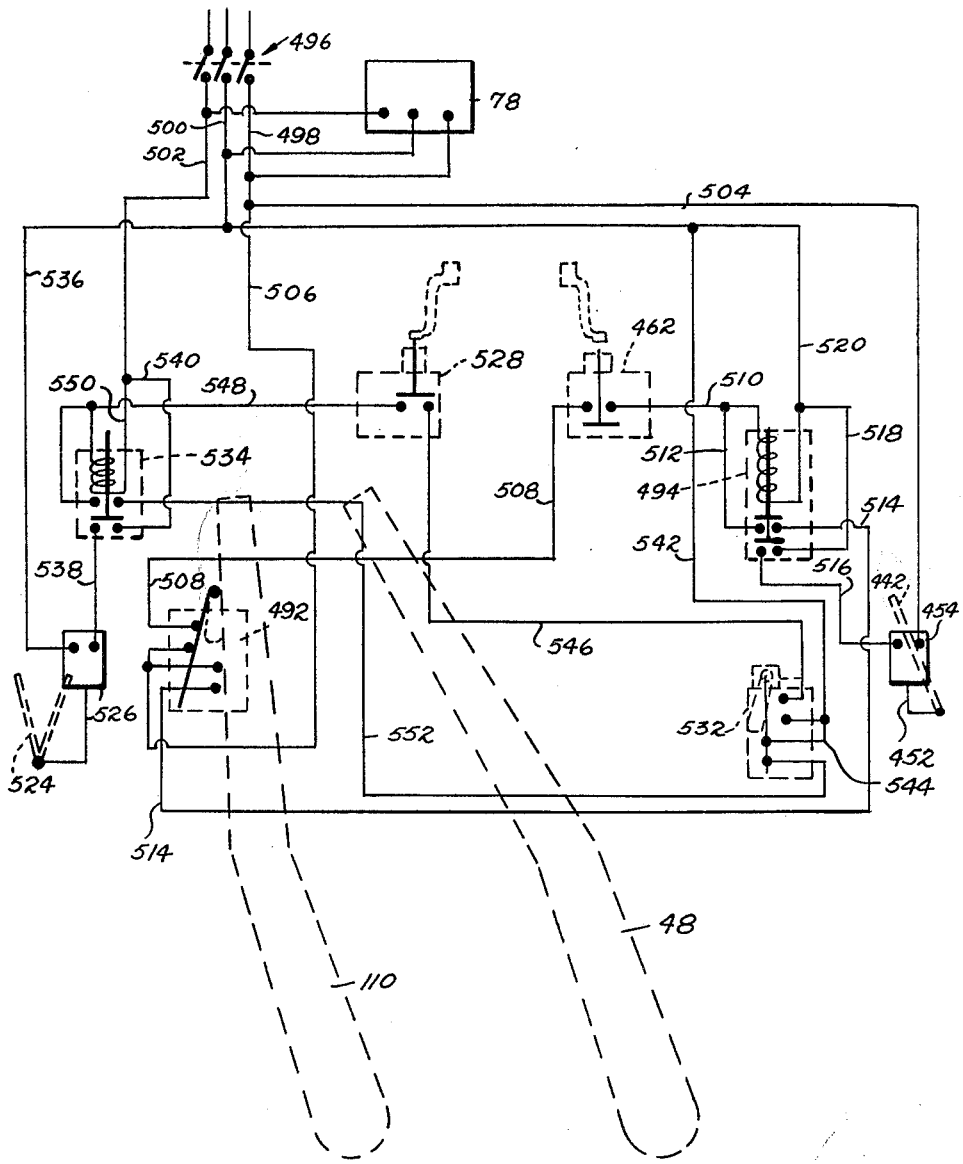
FIGURE 22 is a wiring diagram illustrating the electrical circuit for operating the kernel separating means.

As shown in the wiring diagram of FIGURE 22, the coil of the solenoid has one end thereof connected with the main line 500 through a lead 536 and has its opposite end connected to one of a pair of contacts of the relay through a lead 538. The corresponding contact of the pair is connected to the main line 502 through a lead 540. One contact of each of the pairs of contacts of the microswitch is connected in parallel with the main line 500 through leads 542 and 544. The contact of the corresponding normally open pair of contacts has a lead 546 extending therefrom to one side of the microswitch 528. A lead 548 extends from the opposite side thereof and is connected in parallel with one of a second pair of contacts of the relay and one end of the coil of the relay respectively. The opposite end of the coil of the relay has a lead 550 connected therewith which is in turn connected with the main power line 502. Finally, a lead 552 has one end connected with the associated contact of the second pair of relay contacts and its opposite end connected with the other contact of the pair of normally closed contacts of the switch 532.

Figure 23:
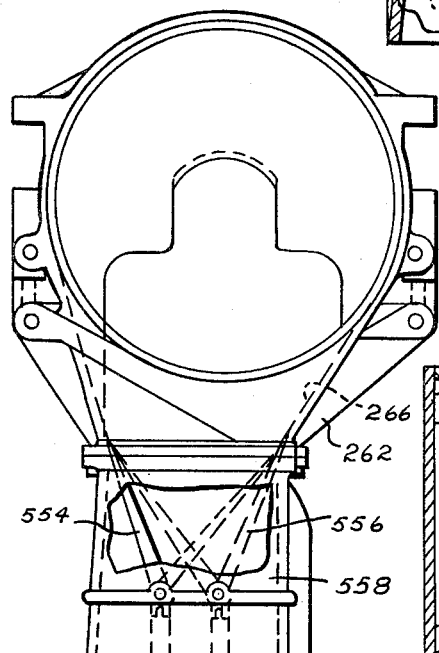
FIGURE 23 is a fragmentary end view, with parts broken away, illustrating a modified form of kernel separation means.
Figure 18:
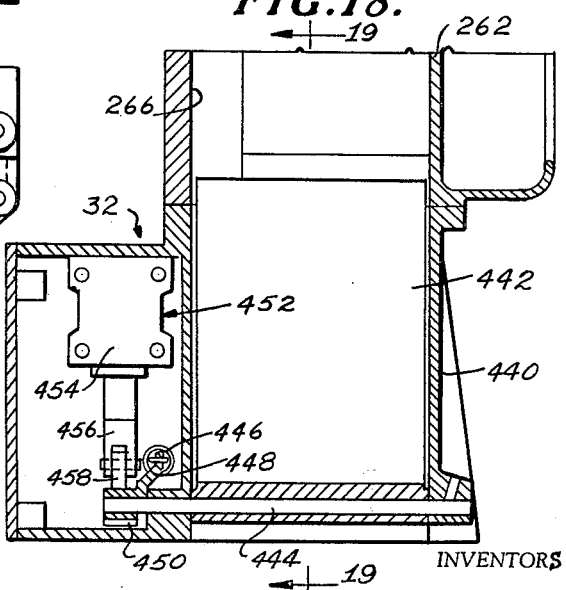
FIGURE 18 is an enlarged fragmentary cross-sectional view taken along the line 18—18 of FIGURE 1 illustrating the kernel separation means.

In FIGURE 23, there is shown an arrangement for effecting a three-way separation of the kernels passing the discharge opening of the cutting head casing. As shown, a pair of spaced deflector gates 554 and 556 are provided, each of which is pivotally mounted at its lower end within the discharge opening of a housing 558. The right-hand deflector gate 556 is spring-urged to engage the adjacent housing wall by a spring arrangement similar to that described in connection with the preferred embodiment, while the left-hand deflector gate 554 is likewise spring-urged into engagement with its adjacent wall. In their normally spring-urged positions, the deflector gates are disposed so as to direct the kernels to the central portion of the housing. The right-hand deflector gate has a solenoid (not shown) associated therewith for moving the same into engagement with the left-hand deflector gate so as to direct the cut kernels to the right-hand side of the housing. In a like manner, the left-hand deflector gate has a solenoid (not shown) associated therewith which is arranged to move the left-hand deflector gate into engagement with the right-hand deflector gate so as to direct the cut kernels to the left-hand side of the housing.

It will be understood that by duplicating the various microswitches and relays described above in connection with the preferred embodiment of the invention that a three-way separation, according to size, can be obtained. Thus, there would be provided two microswitches (not shown) arranged to be actuated in response to movement of the associated ear-engaging member control bell-crank. Both of the microswitches will be maintained in an open position when a relatively small size ear of corn is gripped by the ear-engaging member. When an intermediate size ear is gripped by the ear-engaging members, one of the microswitches is arranged to be actuated, while the other is open. Finally, where relatively large ears are gripped by the ear-engaging member, the other microswitch is arranged to be actuated, while the other is maintained in an open position. As before, there would be associated with each of the microswitches a second microswitch and a relay (not shown) arranged to effect a holding of the circuit to the associated solenoid when the associated microswitch is actuated during the sensing period of the cycle of operation.

*The Operation*

In the normal operation of the present machine, an operator is stationed at the front of the frame and the corn to be fed to the machine is delivered to the table where the operator individually feeds each ear alternatively through the table openings. Since the operation of each cutting head and the feeding means associated therewith is the same, it is believed that a sufficient understanding of the operation can be had by a description of a single cutting head. It will be understood, however, that the cutting heads are alternatively operable. That is, when an ear is being fed through one, the feeding means of the other is being retracted preparatory to receiving the next ear.

With the above in mind, the operation of the device will now be described, beginning with the introduction of the ear by the operator, although it will be understood that the cycle is continuous and this point is chosen for convenience in description only. Referring now to FIGURE 4, it will be noted that when the carriage 36 is fully retracted, the cam surface 182 is immediately operable to effect a movement of the cam follower arm 184 so as to open the ear-engaging members 120 and 132 to receive an ear of corn. During the opening of the ear-engaging members, the carriage dwells at a retracted position and the ear-engaging members are maintained in an open position for a dwell period sufficient to permit the ear previously deposited by the operator in the opening 20 to fall therebetween. At or near the end of the dwell, the cam surface 182 falls off, permitting the ear-engaging members to move into gripping contact with the ear deposited therein under the action of the spring 222. At the same time, or shortly thereafter, the carriage 36 begins its operative stroke. It will also be noted that at the same time that the carriage is beginning its operative stroke, the opposite carriage has completed its operative stroke, so that the control lever 110 thereof will be in its limiting position and, therefore, in a position to actuate the microswitch 492. Actuation of the microswitch 492, therefore, occurs simultaneously with, or just after, the ear-engaging members grip the ear of corn. If the ear is sufficiently large, the microswitch 462 associated therewith will be actuated and the circuit to the associated solenoid 452 will be completed through the relay 494. That is, simultaneous actuation of both microswitches serves to energize the coil of the relay so that the contacts thereof are interconnected and hence the coil of the solenoid energized through leads 504, 516, 518 and 520. In this regard, it will be noted that the normally open contacts of the microswitch 492 will be closed at a point after the microswitch 462 has assumed a position corresponding to the sensing position of the ear-engaging members. Thus, if a large size ear is gripped within the ear-engaging members, the microswitch 462 will be closed and when the normally open contacts of the microswitch 492 are closed upon actuation thereof, solenoid 452 will be energized. If a small ear is gripped by the ear-engaging members, the microswitch 462 will be open when the normally open contacts of the microswitch 492 are closed so that the solenoid will not be energized.

Assuming that the large ear is gripped within the ear-engaging member and the solenoid has been actuated, it will be noted that microswitch 492 is only momentarily actuated so that the closed contacts are immediately allowed to assume their normally open position, which would have the effect of breaking the circuit to the solenoid. The normally closed contacts of the microswitch 492 effect a holding of the circuit, however, and preferably the microswitch 492 is such that when the same is actuated, the normally open contacts will be closed after the normally closed contacts are opened and when the microswitch is released, the open contacts will move into their normally closed position before the closed contacts move into their normally open position. Thus, a holding circuit through lead 520, the relay coil, leads 512 and 514, the normally closed contacts of the microswitch 492 and lead 506 serves to maintain the relay coil energized, which in turn serves to maintain the solenoid energized. The operative stroke of the carriage is continued so that the pronged end of the pusher rod will engage the ear gripped between the ear-engaging members and move the same into the cutting head.

As the ear moves through the cutting head, the depth gage elements will contact the leading end thereof and be moved outwardly. Outward movement of the depth gage elements effects an outward movement of the cutting elements through the motion-transmitting mechanism 332. The depth gage elements continue to contact the exterior surface of the ear as the same moves thereby and if there is variance in the diameter of the ear through its length, the depth gages will move accordingly and a corresponding movement of the cutting blades will take place, so that a highly accurate cutting of the kernels is accomplished.

As briefly indicated above, the movement of the ears through the cutting head is at a rate sufficiently low that accurate sensitivity and control of the cutting blades can be effected by movement of the depth gage elements in contact with the exterior of the ear. In order to take care of differences in varietal characteristics, the motion-transmitting mechanism of the cutting head may be readily adjusted to effect varying rates of movement of the cutting blades between their limiting positions in response to any given rate of movement of the depth gage elements between their limiting positions. Some varieties of hybrid corn have a substantial taper throughout a large part, if not at all, of their length and kernel depth increases as the diameter of the ear increases. Hence, with such varieties it is most efficient to increase the depth of cut of the cutting blades in response to an increase in the diameter of the ear engaged by the depth gage elements. Conversely, some varieties are characterized by ears which are relatively free of taper so that the kernel size does not vary substantially throughout the length of the corn. To efficiently cut such ears, a constant depth of cut, regardless of the size of ear engaged by the depth gage elements, is desirable. The motion-transmitting mechanism of the present cutting head may be readily adjusted to accommodate such variances in corn varieties which illustrate extreme cases. In addition, the present arrangement is readily adapted to accommodate ears which predominately fall in an intermediate range within the two extremes illustrated. This adjustment is accomplished by selectively engaging the connector pins 336, 341 and 368 within one of the apertures in the end of the control lever 330 or one of the apertures in the pivoted plate 338.

In FIGURE 14, the adjustment to accomplish a constant depth of cut is illustrated in which the pin 336 is connected in aperture B at one end of the link 334 and the opposite end of the link is connected in the aperture F of the pivoted plate. The end of the adjusting device is connected in the aperture J. With this setting of the pins, a five-sixteenth of an inch depth of cut is obtained with an adjusting device setting at S, regardless of the size of the ear fed to the cutting head. It will be understood that by turning the knob 354, the constant depth of five-sixteenth of an inch can be readily increased or decreased to obtain any desired depth of cut within the range provided. That is, so long as the motion-transmitting mechanism is retained in the B, F, J setting illustrated, the depth of cut will be constant, as indicated in FIGURE 15, but the amount of the deph of cut can be varied by the adjusting device 342.

In FIGURE 16, an extreme example is illustrated, wherein the motion-transmitting mechanism is set to effect an increase in the depth of cut in response to an increase in the size of the ear. As shown, the link 334 has one end connected with the aperture C in the end of the control lever 330 and its opposite end connected in the aperture D of the pivoted plate. The associated end of the adjusting device is connected with the aperture I and has a T setting. The graph in FIGURE 17 illustrates the various depths of cut achieved with various size ears or with the various diameters throughout the length of a single ear.

In commercial operation, the overwhelming majority of ears processed have a size between one and one-half inch diameter and two and one-quarter inch diameter and in the example illustrated in FIGURES 16 and 17 with a setting of C, D, I and T, one-quarter of an inch depth of cut is achieved at a diameter of one and one-half inches, while a three-eighths of an inch depth of cut is obtained with an ear diameter of two and one-quarter inches. Between these limits, the depth of cut progressively increases as the size increases. It will also be understood that by suitably turning the knob 354 of the adjusting device, these depths of cut can be proportionately increased and/or decreased throughout the entire range.

Other examples of various cuts that can be obtained by interchanging the pins in the various apertures provided are indicated below.

CUT-DEPTH RESULTS FROM DIFFERENT SETTINGS IN CUTTING HEAD

[Basic setting for 2″ ear diameter at 5/16″ in all cases]

| Head setting | | | Adjusting device setting | Total increase in cut-depth between 1″ and 1⅝″ knife spacing | 1½″ ear diam. | 1¾″ ear diam. | 2″ ear diam. | 2⅛″ ear diam. | 2¼″ ear diam. | Maximum depth gage head opening permitted by adjustment |
|---|---|---|---|---|---|---|---|---|---|---|
| Pin 336 | Pin 341 | Pin 368 | | | | | | | | |
| A | F | J | U plus | 0 | 5/16 | 5/16 | 5/16 | 5/16 | 5/16 | 4″. |
| B | F | J | S | 0 | 5/16 | 5/16 | 5/16 | 5/16 | 5/16 | 3⅝″. |
| C | F | J | P | 0 | 5/16 | 5/16 | 5/16 | 5/16 | 5/16 | 3 1/16″. |
| A | E | J | R | 0 | 5/16 | 5/16 | 5/16 | 5/16 | 5/16 | 3⅜″. |
| A | E | J | P minus | 0 | 5/16 | 5/16 | 5/16 | 5/16 | 5/16 | 3″. |
| A | E | I | U minus | 1/64″ | 5/16 | 5/16 | 5/16 | 5/16 | 21/64 | 3⅜″. |
| A | H | J | U | 1/16″ | 9/32 | 9/32 | 5/16 | 5/16 | 11/32 | 4 1/16″. |
| A | F | I | W | 1/16″ | 5/16 | 5/16 | 5/16 | ⅜ | ⅜ | 3¾″. |
| C | H | J | Q | 1/16″ | 9/32 | 19/64 | 5/16 | 21/64 | 11/32 | 3½″. |
| C | D | F | S minus | 1/16″ | 9/32 | 19/64 | 5/16 | 21/64 | 11/32 | 3 1/16″. |
| A | D | F | W minus | 5/64″ | 9/32 | 19/64 | 5/16 | 21/64 | 23/64 | 3 15/16″. |
| A | D | J | S | 3/32″ | ¼ | 9/32 | 5/16 | 21/64 | 11/32 | 3⅞″. |
| B | H | J | S | ⅛″ | 9/32 | 19/64 | 5/16 | 21/64 | 11/32 | 4⅛″. |
| B | D | J | Q | ⅛″ plus | ¼ | 9/32 | 5/16 | 11/32 | ⅜ | 3½″ plus. |
| B | D | F | T plus | ⅛″ | ¼ | 9/32 | 5/16 | 11/32 | ⅜ | 3 9/16″. |
| B | F | I | U | ⅛″ | ¼ | 9/32 | 5/16 | 11/32 | ⅜ | 3 7/16″. |
| C | D | J | O plus | ⅛″ | ¼ | 9/32 | 5/16 | 11/32 | ⅜ | 3 1/16″. |
| C | D | I | T | 3/16″ | 3/16 | ¼ | 5/16 | 11/32 | ⅜ | 3½″. |
| C | F | I | S | 3/16″ | 7/32 | 17/64 | 5/16 | 23/64 | 13/32 | 2⅞″. |
| B | H | I | U plus | 7/32″ plus | 3/16 | 9/32 | 5/16 | 11/32 | 13/32 | 4 1/16″. |
| A | H | I | W | 7/32″ | 3/16 | 9/32 | 5/16 | 11/32 | 13/32 | 4 1/16″. |
| A | D | I | U | 7/32″ | 3/16 | 17/64 | 5/16 | 23/64 | 13/32 | 3⅞″. |
| C | H | I | T | 7/32″ | 3/16 | 17/64 | 5/16 | 23/64 | 13/32 | 3½″. |
| B | D | I | S plus | 7/32″ | 3/16 | 17/64 | 5/16 | 23/64 | 13/32 | 3½″. |
| B | F | K | Q plus | 1 1/32″ | ⅛ | 7/32 | 5/16 | 13/32 | 15/32 | 2 13/16″. |

In the above chart, the adjusting device setting is the one necessary to achieve a five-sixteenth of an inch cut for a two inch diameter ear.

If during the operation of the machine, an ear should become clogged in the cutting head, the means 400 is operative to prevent the opening of the ear-engaging members 120 and 132 to receive the next ear. It will be remembered that the arm end 404 is disposed in the inward path of movement of one of the depth gage arms so that as long as the depth gage arm is disposed in its outer position in engagement with an ear, the spring 430 of the means 400 is operable to position the outer end 428 of the arm 424 in a position within the path of movement of the arm end 434. Thus, unless the depth gage arm moves inwardly, as by the proper passage of an ear therethrough, arm end 428 will remain in this position. Under normal conditions, the spring 370 which resiliently urges the depth gage arm inwardly is sufficient to overcome the tension of spring 430 so that arm end 428 will be moved out of the path of movement of the arm end 434.

With the arm end 424 in the path of movement of the arm end 434, it will be seen that when the cam 182 is operable to effect a turning movement of the shaft 138 to open the ear-engaging members during the carriage dwell, the engagement of the arm end 434 with the arm 428 will prevent the shaft 138 from turning and hence the ear-engaging members from opening. Movement of the cam follower arm 184 by the cam surface 182 will result in the mere compression of the spring 192.

An important feature in the operation of the kernel separation means resides in the fact that the gate 442 will remain in either of its positions so long as the succeeding ear is of the same separation size as the preceding one. For example, after a large ear has passed through the cutting head, the holding circuit remains actuated until the microswitch 492 is again actuated to break the same by opening the normally closed contacts thereof. However, before the holding circuit is broken, the normally open contacts of the microswitch 492 will be closed, if the next ear is also of a size sufficiently large to maintain microswitch 462 closed. In this way, the gate will remain in the dotted line position shown in FIGURE 19 until such time as a small ear is sensed so that when the normally open contacts of the microswitch 492 are closed, the solenoid will not be energized because microswitch 462 is open. Conversely, it will be understood that gate will remain in its spring-urged solid line position, as shown in FIGURE 19, so long as succeeding ears are of a sufficiently small size, that is, the solenoid 452 is never energized and held energized if, during the momentary closing of the normally open contacts of the microswitch 492, the microswitch 462 is not closed.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:

1. In a corn cutting machine, the combination comprising an elongated frame, cutting means disposed at each of the opposite ends of said frame, said cutting means having parallel cutting axes extending longitudinally of said frame in transversely spaced relation, each of said cutting means comprising a plurality of cutting blades arranged circumferentially about the associated cutting axis, a pair of transversely spaced ear guiding and centralizing means carried by said frame, each guiding means being associated with one of said cutting means and having an ear guiding and centralizing axis longitudinally aligned with the axis of the associated cutting means, a pair of parallel pusher rods, each pusher rod being associated with one of said guiding means and having an ear engaging end, means separately mounting each of said pusher rods on said frame for longitudinal translational movement axially through the associated guiding means from an ear receiving position wherein said ear engaging pusher rod end is disposed in spaced relation with respect to the associated cutting means a distance sufficient to permit an ear of corn to be positioned in the associated guiding means between said pusher rod end and the associated cutting means to an ear discharging position wherein said ear engaging pusher rod end is operable to move an ear engaged thereby outwardly of the associated guiding means and through the associated cutting means, and power operated means carried by said frame operatively connected with both of said pusher rods for moving one of said pusher rods through a cycle of movement from said ear receiving position to said ear discharging position at a relatively slow speed so as to feed an ear through the associated cutting means and then from said ear discharging position to said ear receiving position at a relatively high speed so as to receive another ear and for moving the other of said pusher rods through an identical cycle of movement 180° out of phase with the cycle of movement of said one pusher rod.

2. The combination as defined in claim 1 wherein said power operated means comprises an endless cam surface, and a cam follower means engaging said cam surface and connected with each pusher rod.

3. The combination as defined in claim 2 wherein each cam follower means comprises a cam roller engaged with said cam surface, a lever pivoted on said frame and carrying said roller, and a link connecting said lever to the associated pusher rod.

4. The combination as defined in claim 1 wherein said frame has a cover mounted thereon, said cover having an elongated ear receiving opening formed therein in a position above and parallel with each of said ear guiding means through which an ear of corn is deposited into the associated ear guiding means.

5. The combination as defined in claim 4 wherein said ear receiving openings are spaced apart longitudinally and transversely, the upper surface of said table adjacent each opening being inclined downwardly and outwardly on one side of each of the respective openings.

6. The combination as defined in claim 4 wherein the upper edge surface adjacent one side of each ear receiving opening is disposed above the upper edge surface adjacent the opposite side of each ear receiving opening.

References Cited in the file of this patent

UNITED STATES PATENTS

| 1,104,677 | Kiovsky | July 21, 1914 |
| 1,251,885 | Hanusch | Jan. 1, 1918 |
| 1,909,667 | Douthitt | May 16, 1933 |
| 2,029,344 | Sheldon | Feb. 4, 1936 |
| 2,332,894 | Cover | Oct. 26, 1943 |
| 2,717,606 | Batzle | Sept. 13, 1955 |

FOREIGN PATENTS

| 106,305 | Australia | Jan. 3, 1939 |